United States Patent
Herzog et al.

(10) Patent No.: US 12,309,235 B2
(45) Date of Patent: *May 20, 2025

(54) DETERMINING APPLICATION SECURITY AND CORRECTNESS USING MACHINE LEARNING BASED CLUSTERING AND SIMILARITY

(71) Applicant: ServiceNow, Inc., Santa Clara, CA (US)

(72) Inventors: Shay Herzog, Petah Tikva (IL); Aakash Umeshbhai Bhagat, Bangalore (IN); Olga Zateikin, Petah Tikva (IL); Robert Bitterfeld, Petah Tikva (IL); Asaf Garty, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,345

(22) Filed: Oct. 18, 2023

(65) Prior Publication Data

US 2024/0048629 A1 Feb. 8, 2024

Related U.S. Application Data

(63) Continuation of application No. 17/207,166, filed on Mar. 19, 2021, now Pat. No. 11,831,729.

(51) Int. Cl.
*H04L 67/00* (2022.01)
*G06F 18/22* (2023.01)
(Continued)

(52) U.S. Cl.
CPC ............. *H04L 67/34* (2013.01); *G06F 18/22* (2023.01); *G06F 18/23* (2023.01); *G06N 20/00* (2019.01); *H04L 41/16* (2013.01)

(58) Field of Classification Search
None
See application file for complete search history.

(56) References Cited

U.S. PATENT DOCUMENTS 4,941,084 A 7/1990 Terada
5,185,860 A 2/1993 Wu
(Continued)

FOREIGN PATENT DOCUMENTS

CN 111930275 A * 11/2020
EP 0433979 A2 6/1991
(Continued)

OTHER PUBLICATIONS

Paris IT Operations Management, ServiceNow, Mar. 16, 2021.
(Continued)

*Primary Examiner* — Ario Etienne
*Assistant Examiner* — Mohammad A. Mian
(74) *Attorney, Agent, or Firm* — McDonnell Boehnen Hulbert & Berghoff LLP

(57) ABSTRACT

A computing system includes persistent storage configured to store representations of software applications installed on computing devices, and a software application configured to perform operations, including retrieving, from the persistent storage, a first plurality of representations of a first plurality of software applications installed on a particular computing device and a second plurality of representations of a second plurality of software applications installed on a reference computing device. The operations also include determining a device fingerprint of the particular computing device based on the first plurality of representations and a reference device fingerprint of the reference computing device based on the second plurality of representations, and comparing the device fingerprint to the reference device fingerprint. The operations further include, based on the comparing, deter- (Continued)

mining a disparity between software applications installed on the particular computing device and the reference computing device, and storing, in the persistent storage, a representation of the disparity.

20 Claims, 14 Drawing Sheets

(51) Int. Cl.
*G06F 18/23* (2023.01)
*G06N 20/00* (2019.01)
*H04L 41/16* (2022.01)

(56) References Cited

U.S. PATENT DOCUMENTS

| | | |
|---|---|---|
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,685,149 B2 * | 3/2010 | Butcher .......... G06F 21/50 713/188 |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,166,348 B1 | 4/2012 | Kulkarni |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 8,959,061 B1 * | 2/2015 | Dutch .......... G06F 11/1415 709/248 |
| 9,053,460 B2 | 6/2015 | Gilbert |
| 9,065,727 B1 * | 6/2015 | Liu .......... H04L 43/04 |
| 9,069,737 B1 | 6/2015 | Kimotho |
| 9,971,826 B1 | 5/2018 | Belmar |
| 10,599,538 B2 * | 3/2020 | Vichare .......... G06F 9/5038 |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,226,858 B1 | 1/2022 | Srivastava |
| 11,275,580 B2 | 3/2022 | Tamir |
| 11,277,475 B1 | 3/2022 | Tal |
| 11,281,442 B1 | 3/2022 | Tal |
| 11,290,439 B1 * | 3/2022 | DePue .......... H04W 12/084 |
| 11,294,666 B1 | 4/2022 | Look |
| 11,296,922 B2 | 4/2022 | Leibkowiz |
| 11,296,971 B1 | 4/2022 | Jain |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,521,714 B1 * | 12/2022 | Jain .......... G16H 10/60 |
| 11,582,106 B2 | 2/2023 | Hameiri |
| 11,616,690 B2 | 3/2023 | Feiguine |
| 11,630,717 B2 | 4/2023 | Vutukuru |
| 11,632,303 B2 | 4/2023 | Bitterfeld |
| 11,640,369 B2 | 5/2023 | Bhogle |
| 11,671,444 B2 | 6/2023 | Waplington |
| 11,695,641 B2 | 7/2023 | Bar Oz |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |

(56) References Cited

U.S. PATENT DOCUMENTS

| | | |
|---|---|---|
| 2006/0026453 A1 | 2/2006 | Frost |
| 2006/0095461 A1 | 5/2006 | Raymond |
| 2006/0179058 A1 | 8/2006 | Bram |
| 2006/0288053 A1 | 12/2006 | Holt |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0040088 A1 | 2/2008 | Vankov |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2010/0146325 A1 | 6/2010 | John |
| 2010/0166384 A1 | 7/2010 | Adimatyam |
| 2011/0131453 A1 | 6/2011 | Fernandess |
| 2012/0016706 A1 | 1/2012 | Pargaonkar |
| 2012/0042216 A1 | 2/2012 | Blubaugh |
| 2013/0238925 A1 | 9/2013 | Gerhart |
| 2013/0283273 A1 | 10/2013 | Miyazaki |
| 2014/0122427 A1 | 5/2014 | Dary |
| 2016/0092768 A1 | 3/2016 | Patil |
| 2016/0164866 A1 | 6/2016 | Oberheide |
| 2018/0107920 A1 | 4/2018 | Jayaraman |
| 2018/0123940 A1 | 5/2018 | Rimar |
| 2018/0173217 A1 | 6/2018 | Spiro |
| 2019/0068745 A1* | 2/2019 | Gu .................. H04L 67/303 |
| 2019/0073257 A1 | 3/2019 | Dasgupta |
| 2019/0104398 A1 | 4/2019 | Owen |
| 2019/0129739 A1 | 5/2019 | Al Reza |
| 2019/0149515 A1 | 5/2019 | Sharma |
| 2019/0155682 A1 | 5/2019 | Sinha |
| 2019/0165957 A1 | 5/2019 | Abbott |
| 2019/0266506 A1 | 8/2019 | Feldman |
| 2019/0342162 A1 | 11/2019 | Bendre |
| 2020/0012918 A1 | 1/2020 | Malhotra |
| 2020/0034462 A1 | 1/2020 | Narayanasamy |
| 2020/0050689 A1 | 2/2020 | Tal |
| 2020/0204443 A1 | 6/2020 | Bar Oz |
| 2020/0241917 A1* | 7/2020 | Chen ..................... G06F 9/3836 |
| 2020/0272923 A1 | 8/2020 | Banerjee |
| 2020/0301678 A1 | 9/2020 | Burman |
| 2021/0097168 A1 | 4/2021 | Patel |
| 2021/0182387 A1 | 6/2021 | Zhu |
| 2021/0194764 A1 | 6/2021 | Badyan |
| 2021/0342209 A1 | 11/2021 | Kishore |
| 2022/0012272 A1 | 1/2022 | Burli |

FOREIGN PATENT DOCUMENTS

| | | |
|---|---|---|
| EP | 1607824 A2 | 12/2005 |
| WO | 9934285 W | 7/1999 |
| WO | 0052559 W | 9/2000 |
| WO | 0179970 W | 10/2001 |
| WO | WO-2021213084 A1 * | 10/2021 ............. G06F 9/542 |

OTHER PUBLICATIONS

United States Patent & Trademark Office, Non-Final Office Action issued May 12, 2022, issued in connection with U.S. Appl. No. 17/142,769, filed Jan. 6, 2021.

United States Patent & Trademark Office, Non-Final Office Action issued Oct. 14, 2022, issued in connection with U.S. Appl. No. 17/142,769, filed Jan. 6, 2021.

* cited by examiner

DETERMINING APPLICATION SECURITY AND CORRECTNESS USING MACHINE LEARNING BASED CLUSTERING AND SIMILARITY

CROSS-REFERENCE TO RELATED APPLICATIONS

This application is a continuation of and claims priority to U.S. patent application Ser. No. 17/207,166, filed Mar. 19, 2021, and titled "Determining Application Security and Correctness using Machine Learning Based Clustering and Similarity," which is hereby incorporated by reference as if fully set forth in this description.

BACKGROUND

Computing devices, software applications, storage structures, and other computing resources that make up a computer network may be discovered and the relationships therebetween may be mapped. Representations of these elements of the computer network, as well as the relationships, may be stored in a database. The stored representation may later be retrieved and used to generate a visualization of a state or arrangement of these elements within the computer network, or used for other purposes. Discovering computing resources involves developing software processes that are capable of gathering the information needed for detection, classification, and/or identification of these computing resources.

SUMMARY

A computer network may include a plurality of computing devices. Each respective computing device of the plurality of computing devices may include installed thereon a corresponding set of one or more software applications. The corresponding set of software applications may change as new software applications are installed, and/or existing software applications are deleted and/or updated. In some cases, some changes and/or absence of some changes to the set of software applications may be undesirable. For example, installing a malicious software application, failing to update a (non-malicious) software application, and/or failing to delete a software application no longer in use may each be undesirable. Thus, the corresponding set of software applications may deviate from a reference, or target, set of software applications that is desired and/or intended to be installed on the respective computing device.

In order to reconcile the discrepancy between the reference set of software applications and the set of software applications actually installed on the computing device, a discovery process may be executed to collect information about the software applications installed on each computing device. For example, the collected information may include various attributes associated with software processes corresponding to a given software application. The collected information may be processed to generate, for each respective software application, a corresponding representation thereof, which may be referred to as an application fingerprint.

The reference set of software applications may be defined, for example, by selecting, from the plurality of computing devices, a reference computing device which includes the desired and/or intended software applications and lacks (i.e., is free of) undesired and/or unintended software applications. Specifically, the software applications installed on and/or executed by the reference computing device may form the reference set of software applications. In other implementations, the reference set of software applications may be defined by selecting one or more software applications discovered across different computing devices.

As the number of computing devices in the computer network increases, selecting the reference computing device and/or determining to which other computing devices the reference set of software applications of the reference computing device is to be compared may become increasingly difficult. Specifically, the computer network may include multiple groupings of computing devices intended to perform the same or similar operations, and thus intended to have the same or similar software applications installed and/or executing thereon. Accordingly, each grouping of computing devices may be associated with a corresponding reference set of software applications (and thus a corresponding reference computing device), and comparing the reference computing device of a particular grouping to computing devices of another grouping might not provide useful and/or meaningful information. However, these groupings and/or the contents thereof might not be known, tracked, and/or otherwise apparent to a user.

Accordingly, selection of a reference computing device and/or the computing devices to which the reference computing device is to be compared, at the application level, may be facilitated by generation of a device fingerprint for each computing device. Specifically, the device fingerprint of a given computing device may be based on the application fingerprints of the software applications installed thereon and/or executed thereby. In one example, the device fingerprint may be a concatenation of the corresponding application fingerprints or a subset thereof. In another example, the device fingerprint may be generated by processing the corresponding application fingerprints or a subset thereof by a machine learning model. The device fingerprints may be used to identify computing devices that are similar, related, and/or intended to perform the same or similar operations, and thus reduce the space of potential application-level comparisons with the reference set of software applications of the reference computing device.

In one implementation, the device fingerprints may be used to generate clusters, or groupings, of the plurality of computing devices. Specifically, computing devices with the same or similar device fingerprints may be grouped as part of the same cluster. The reference computing device may be selected from a particular cluster, and may be compared to other computing devices within the particular cluster. Thus, the application-level comparison with the reference computing device may be scoped to other computing devices that are logically and/or operationally related to the reference computing device. Accordingly, computing and/or user resources might not be spent on performing and/or evaluating application-level comparisons between software applications of computing devices that are not intended to perform similar operations.

In another implementation, the reference computing device may be selected, and the device fingerprints may be used to determine respective similarities of the other computing devices to the reference computing device. The respective similarities may be used to rank the other computing devices, and up to a predetermined number (e.g., a user-selected number) of the highest-ranked other computing devices may be selected for application-level comparison to the respective computing device. Additionally or alternatively, a given computing device may be included in the ranking based the corresponding similarity exceeding a threshold similarity value. Accordingly, computing and/or user resources might not be spent on performing and/or evaluating application-level comparisons between software applications of computing devices that are dissimilar and/or differ by more than a threshold amount. In some implementations, the similarity approach may be used in combination with the clustering approach to rank the computing devices within a cluster relative to the reference computing device.

Comparing the software applications installed on a particular computing device to software applications installed on the reference computing device may reveal a disparity (e.g., difference or discrepancy) between these two sets of software applications. For example, the disparity may indicate compliant software applications that are installed on both the particular computing device and the reference computing device, missing software applications that are installed on the reference computing device but are not installed on the particular computing device, and/or unauthorized software applications that are installed on the particular computing device but are not installed on the reference computing device.

The disparity may be saved and/or a visual representation of the disparity may be displayed by way of a user interface. The disparity may be used as a basis for suggesting one or more modifications to software applications of the particular computing device intended to reduce the disparity. The suggested modifications may be executed manually by a user, and/or automatically by a software application based on and/or in response to a user selection of one or more of the modifications. By determining the disparities across a plurality of computing devices, the respective sets of software applications installed on computing devices in the network may be adjusted and/or modified to achieve a desired and/or intended state and/or distribution. For example, the disparity may be determined to assist with and/or validate a data center migration and/or assist with providing a response to an application audit request, among other possibilities.

Accordingly, a first example embodiment may involve persistent storage configured to store representations of software applications installed on computing devices and a mapping application configured to perform operations. The operations may include retrieving, from the persistent storage, (i) a first plurality of representations of a first plurality of software applications installed on a particular computing device of the computing devices and (ii) a second plurality of representations of a second plurality of software applications installed on a reference computing device of the computing devices. The operations may also include determining (i) a device fingerprint of the particular computing device based on the first plurality of representations and (ii) a reference device fingerprint of the reference computing device based on the second plurality of representations. The operations may additionally include comparing the device fingerprint to the reference device fingerprint and, based on comparing the device fingerprint to the reference device fingerprint, determining a disparity between software applications installed on the particular computing device and the reference computing device. The operations may further include storing, in the persistent storage, a representation of the disparity.

A second example embodiment may involve retrieving, from persistent storage configured to store representations of software applications installed on computing devices, (i) a first plurality of representations of a first plurality of software applications installed on a particular computing device of the computing devices and (ii) a second plurality of representations of a second plurality of software applications installed on a reference computing device of the computing devices. The second embodiment may also involve determining (i) a device fingerprint of the particular computing device based on the first plurality of representations and (ii) a reference device fingerprint of the reference computing device based on the second plurality of representations. The second embodiment may additionally involve comparing the device fingerprint to the reference device fingerprint and, based on comparing the device fingerprint to the reference device fingerprint, determining a disparity between software applications installed on the particular computing device and the reference computing device. The second embodiment may further involve storing, in the persistent storage, a representation of the disparity.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
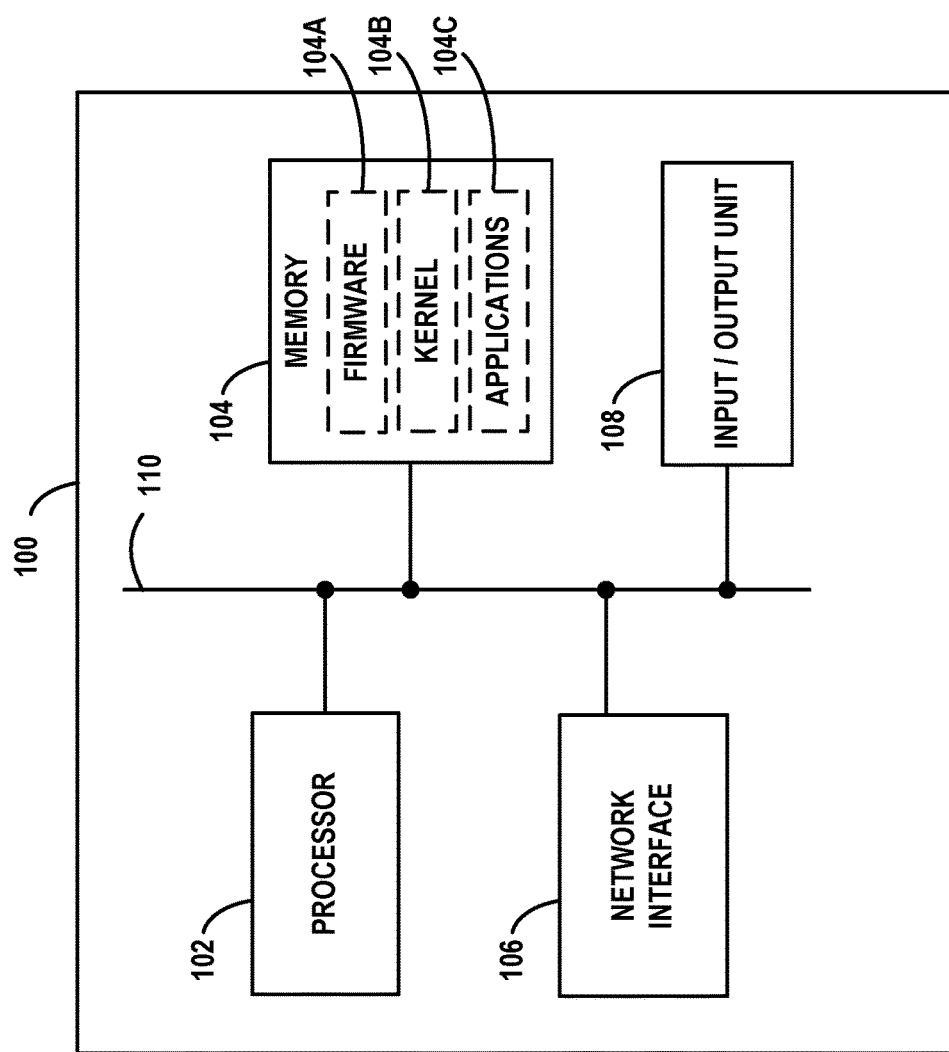
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
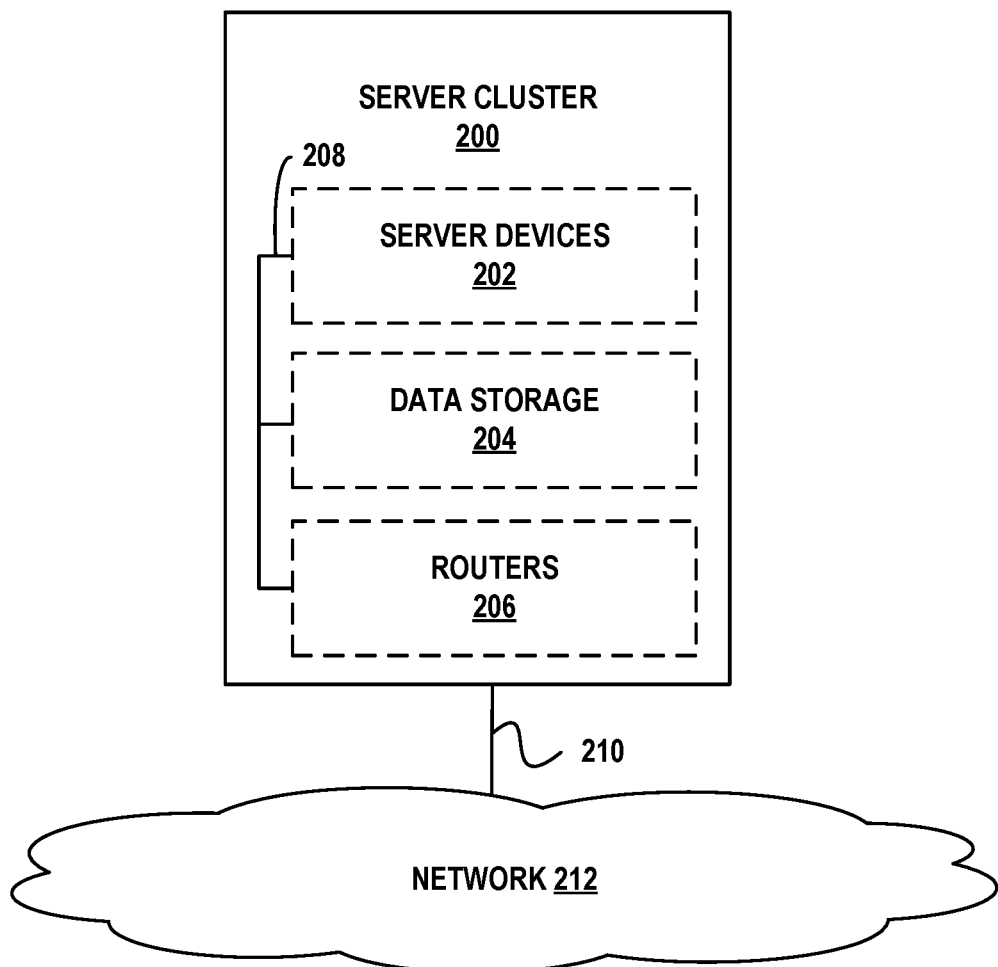
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
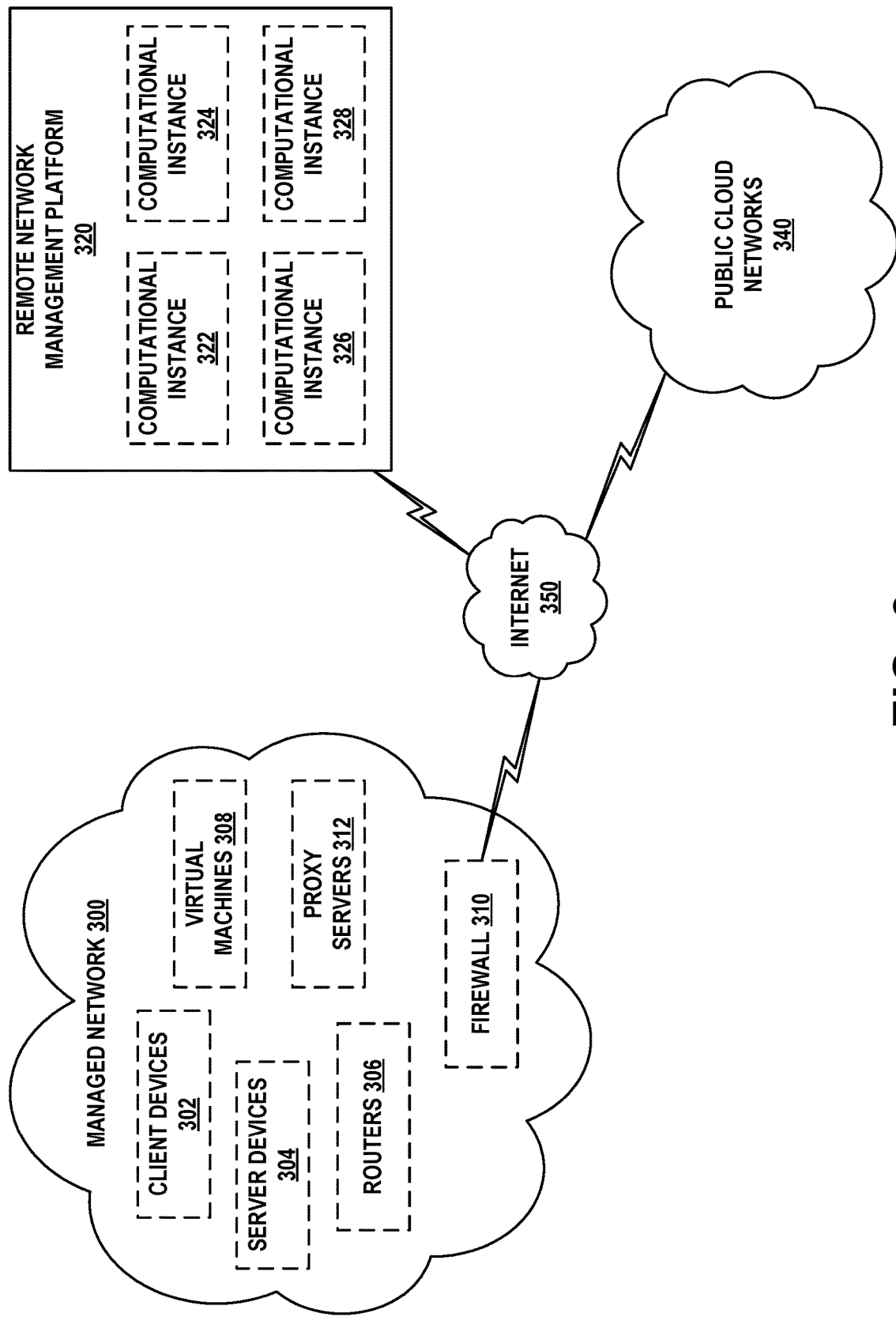
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
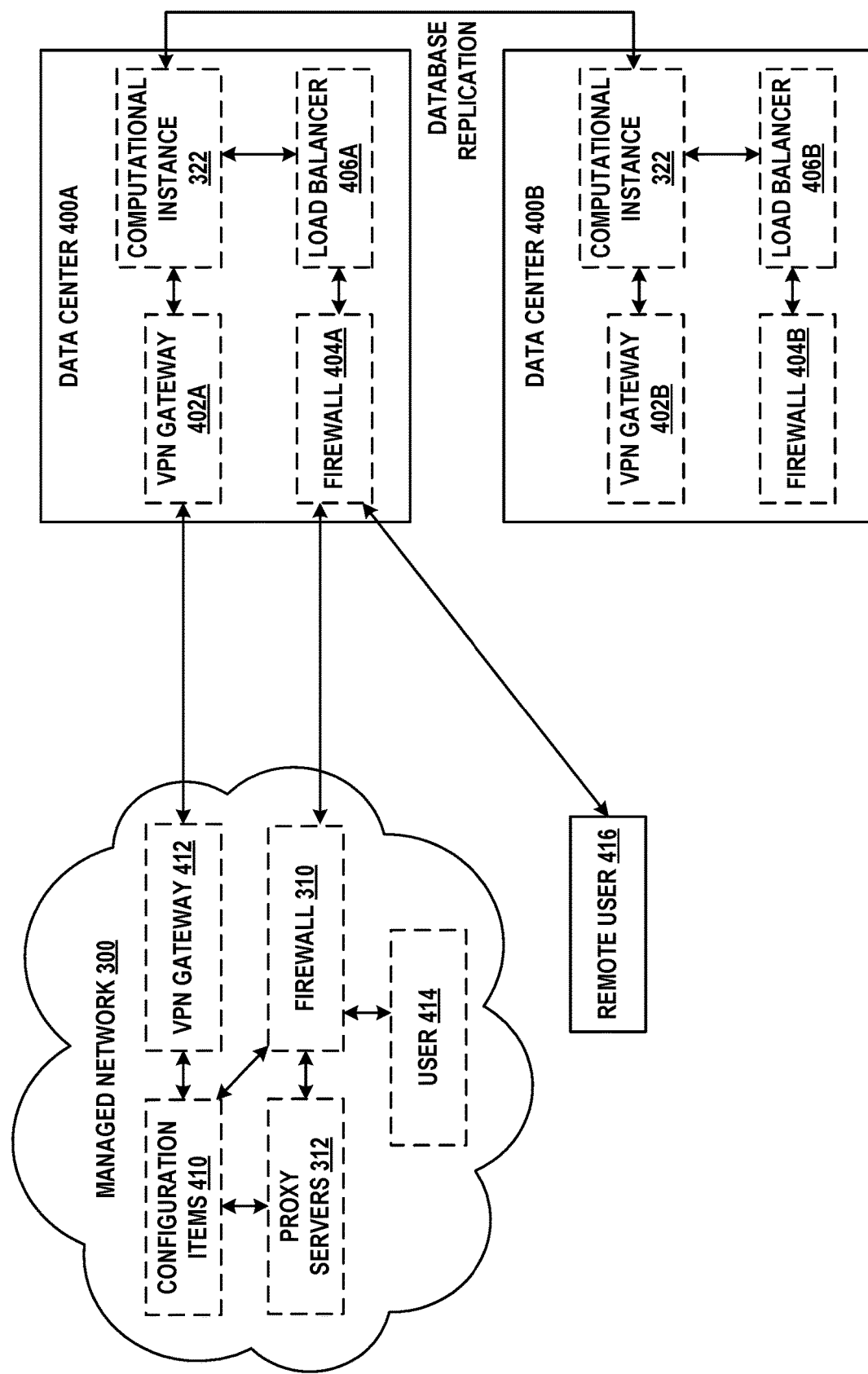
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
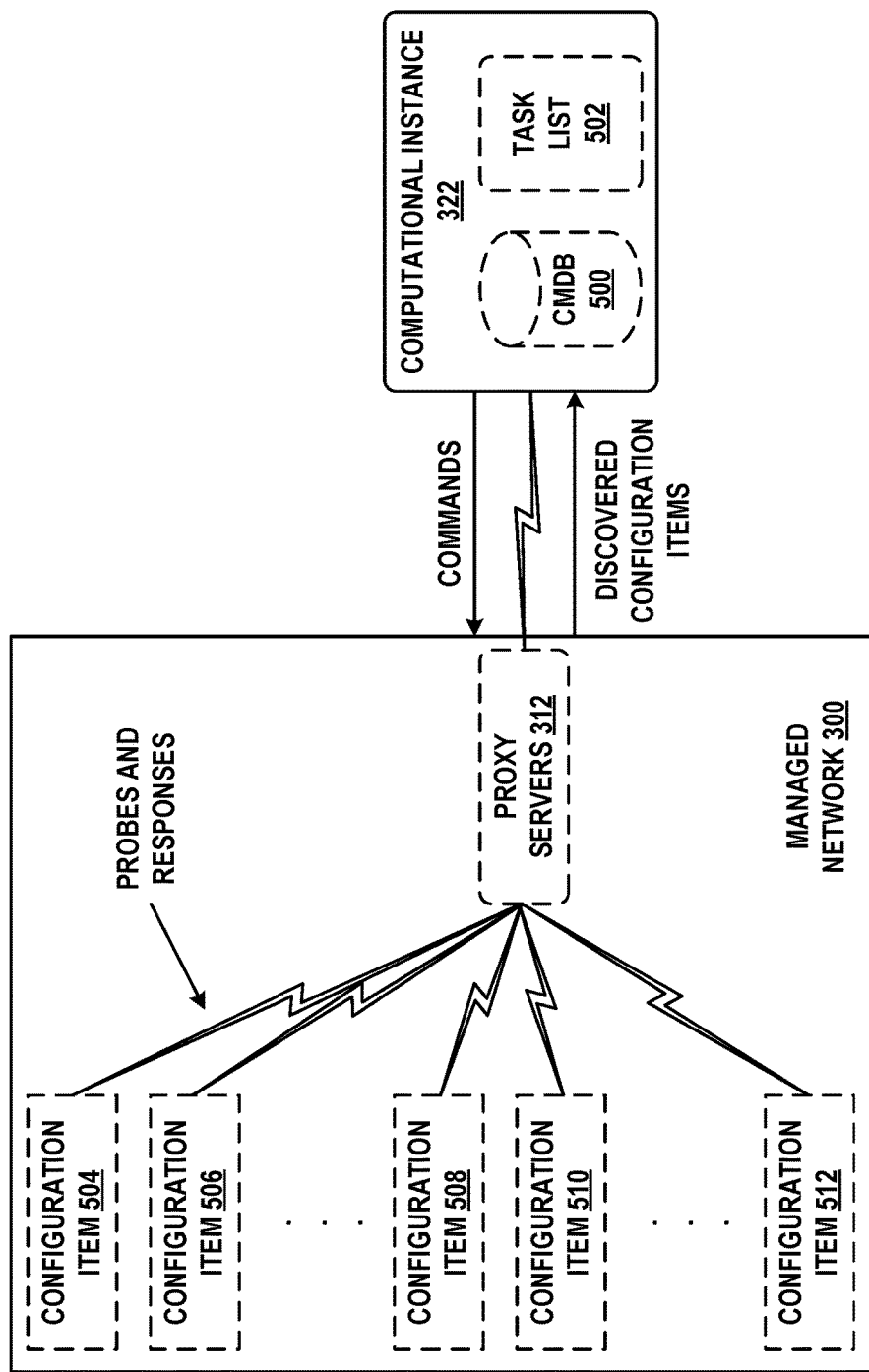
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
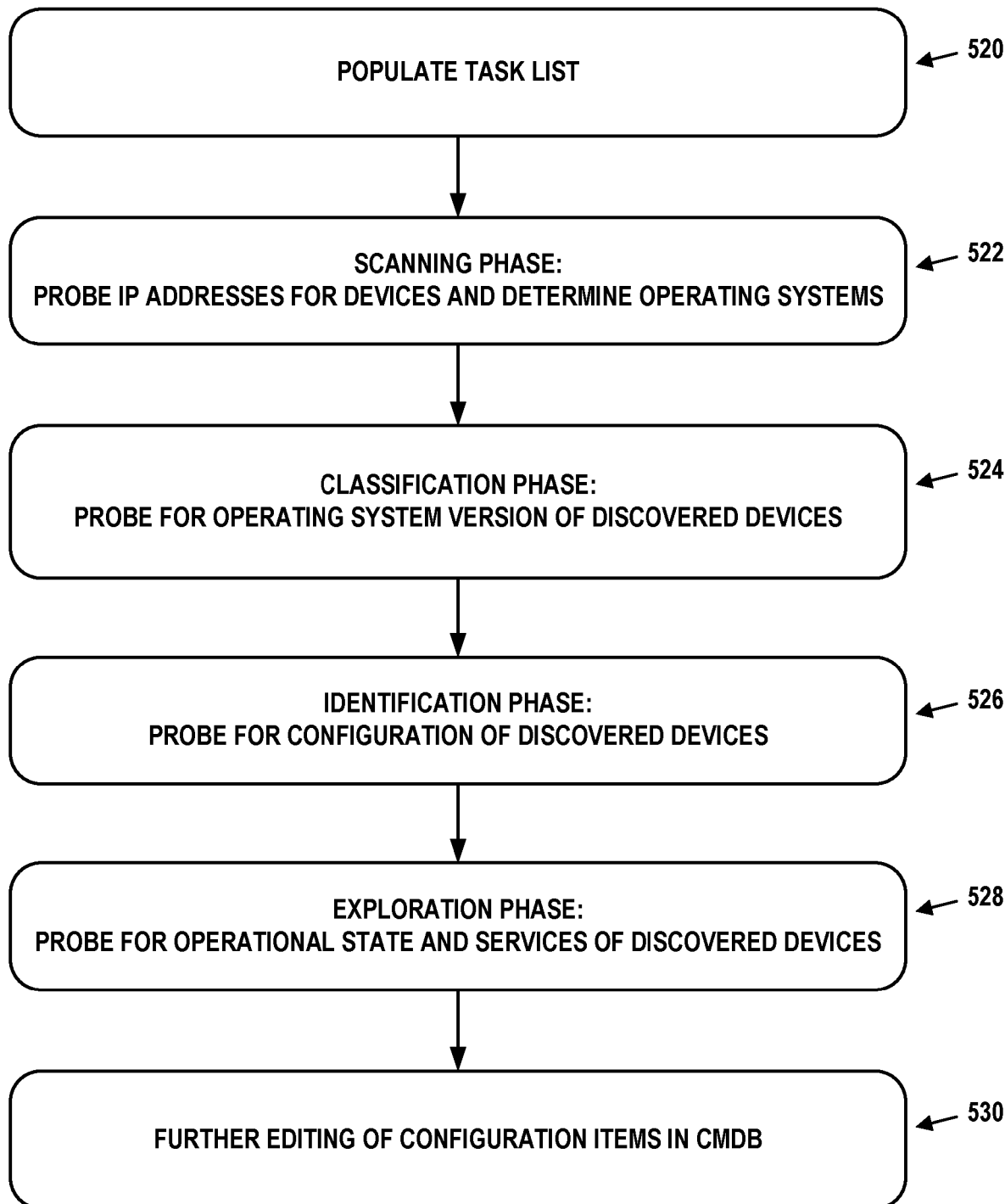
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Device Fingerprint and Application Disparity Determination

Figure 6:
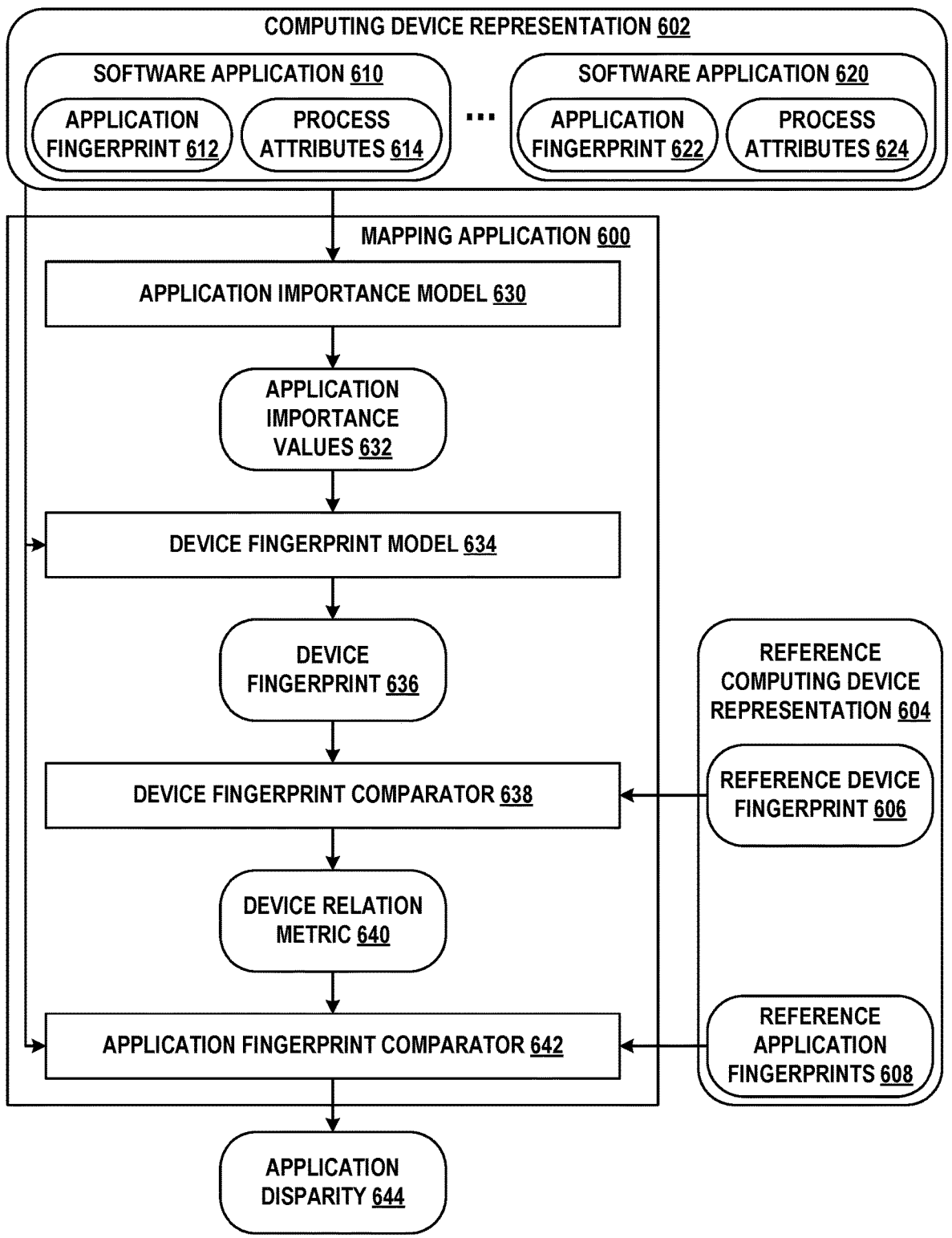
FIG. 6 depicts a mapping application, in accordance with example embodiments.

FIG. 6 illustrates aspects of an example software application that may be used to determine and/or generate device fingerprints and, based thereon, determine a disparity between different computing devices. Specifically, mapping application 600 includes application importance model 630, device fingerprint model 634, device fingerprint comparator 638, and application fingerprint comparator 642. Mapping application 600 may be configured to determine application disparity 644 based on computing device representation 602 and reference computing device representation 604.

Computing device representation 602 may represent a particular computing device of a plurality of computing devices within managed network 300. Similarly, reference computing device representation 604 may represent a reference computing device (i.e., a computing device used as a point of comparison for other computing devices) of the plurality of computing devices. Representations 602 and 604 may be stored in persistent storage, which may be accessible by mapping application 600. In some implementations, mapping application 600 and/or the persistent storage may be disposed within computational instance 322.

Mapping application 600, or another separate software application, may be configured to communicate with proxy servers 312 to perform at least some discovery operations. For example, representation 602 and/or 604 may be generated by and/or based on execution of the discovery operations. Thus, in some cases, mapping application 600 may alternatively be referred to as a discovery application, or a discovery and mapping application. The persistent storage may represent, for example, CMDB 500 or some other database in which mapping application 600 may be configured to store information collected and/or generated as part of the discovery and/or mapping operations.

Computing device representation 602 may be associated with representations of software applications installed on the particular computing device (i.e., configured to be executed and/or actually executed by the particular computing device). For example, the particular computing device may have installed thereon software application 610 through software application 620 (i.e., software applications 610-620). Software application 610 may be associated with application fingerprint 612 and process attributes 614, while software application 620 may be associated with application fingerprint 622 and process attributes 624. Thus, software applications 610-620 may be associated with application fingerprints 612-622, respectively, and process attributes 614-624, respectively.

The corresponding application fingerprint of each respective software application of software applications 610-620 may be generated based on attributes of one or more software processes corresponding to the respective software application. Thus, application fingerprint 612 may be based on process attributes 614 and application fingerprint 622 may be based on process attributes 624. Application fingerprints 612-622 may be generated such that each application fingerprint is unique to its corresponding software application. When, for example, software applications 610 is also installed on another computing device of the plurality of computing devices, its representation may be associated with application fingerprint 612 and a set of process attributes that is specific to the other computing device (and thus possibly different from process attributes 614). Accordingly, the process attributes may be indicative of differences in how a same software application is used differently across different computing devices within managed network.

A software process may represent a particular instantiation and/or occurrence of execution of the software application by a computing device, and may include one or more process threads. Each of process attributes 614-624 may include data generated by the corresponding software application, stored in one or more files associated with the corresponding software application, provided as input to the corresponding software application, generated by one or more other software applications communicatively connected to the corresponding software application, and/or generated by a computing device in connection with execution of the software application, among other possibilities. Thus, the process attributes may be obtained from one or more sources expected to contain data that is indicative of attributes of the corresponding software application and/or relationships between the corresponding software application and other computing resources.

For example, the process attributes may include software process data generated by an operating system of a computing device in connection with one or more software processes associated with execution of the corresponding software application. The software process data may be generated in different ways depending on the operating system. For example, on UNIX® and/or a UNIX®-like operating systems, the software process data may be generated by the "process status" ("ps") command/program. In another example, on WINDOWS® operating systems, the software process data may be generated by the "tasklist" command/program, and/or the "process" command/program provided as part of WINDOWS® management instrumentation command-line ("wmic").

Thus, the process attributes may include, for example, a process name, an executable file name, a file system path, an execution command, and/or input arguments, among other information contained in the software process data. The process name may be a name associated with the corresponding software process. The executable file name may indicate the name of an executable file that (i) stores instructions that define at least part of the corresponding software application and/or (ii) is selected and/or used to execute at least part of the corresponding software application. The file system path may indicate a location and/or address within a file system of the computing device at which the executable file and/or another file related to the corresponding software application is stored. The execution command may indicate a command provided to, for example, an operating system shell to cause/initiate execution of the corresponding software application. The input arguments may indicate one or more inputs provided to the corresponding software application upon initiation of execution thereof and/or during execution thereof.

In some implementations, a given application fingerprint may be represented as a vector that includes a plurality of values that represent the corresponding process attributes. Thus, the vector may be viewed as an embedding of the corresponding process attributes in a multi-dimensional vector space. In other implementations, the given application fingerprint may be represented as a character string that represents the corresponding process attributes. For example, the character string may be a combination of a predetermined number of terms that distinguish the corresponding software application from other software applications. In some cases, the process attributes may be processed by one or more machine learning models (e.g., an artificial neural network, a clustering algorithm, etc.) to generate at least part of the corresponding application fingerprint.

Application importance model 630 may be configured to generate application importance values 632 based on the representations of software applications 610-620. Application importance values 632 may include a corresponding importance value for each of software applications 610-620. Application importance values 632 may include, for example, a classification of each application into one of a predetermined number of categories (e.g., low importance, moderate importance, high importance), and/or a numerical value indicative of an importance of a corresponding application along a predetermined scale (e.g., 0 to 100, with 0 representing a lowest importance and 100 representing a highest importance).

The importance value of a given application may be indicative of an extent to which the given software application distinguishes a corresponding computing device from other computing devices. For example, an importance value associated with software application 610 may be based on a product of (i) a first frequency with which software application 610 is executed on the particular computing device associated with representation 602 and (ii) a second frequency with which software application 610 is executed across the plurality of computing devices within managed network 300. Thus, software application 610 may be considered important to the particular computing device when software application 610 is executed relatively frequently on the particular computing device and/or is executed relatively infrequently on other computing devices.

Device fingerprint model 634 may be configured to determine device fingerprint 636 for computing device 602 based on the representations of software application 610-620 and application importance values 634. Device fingerprint model 634 may implement the function $F^{DEVICE}=f(F_0^{APP}, I_0^{APP}, \ldots, F_N^{APP}, I_N^{APP})$, where $F^{DEVICE}$ represents device fingerprint 636, $F_i^{APP}$ represents an application fingerprint of the ith software application, $I_i^{APP}$ represents an importance value of the ith software application, and the indexes 0-N correspond to software applications 610-620. Reference device fingerprint 606 of reference computing device representation 604 may be generated by mapping application 600 in a similar manner based on the application fingerprints and/or importance values associated with software applications installed on the reference computing device.

Notably, when device fingerprints are based on corresponding application fingerprints, two different computing devices having different hardware configurations may share a same or similar device fingerprint when these devices have installed thereon the same or similar software applications. Device fingerprint 636 may thus more accurately reflect the function of the corresponding computing device within managed network 300 than other identifiers that are based on attributes of the particular computing device itself (e.g., the hardware configuration thereof) but that are not based on the attributes of the software applications installed thereon. In some implementations, in addition to being based on corresponding application fingerprints, a device fingerprint may also be based on one or more attributes of the corresponding computing device itself.

In one example, device fingerprint model 634 may be configured to generate device fingerprint 636 by concatenating a plurality of application fingerprints of software applications that are associated with respective importance values that exceed a threshold importance value. That is, device fingerprint model 634 may implement the function $F^{DEVICE}=\text{CONCATENATE}[F_0^{APP}, \ldots, F_N^{APP}]$ for all i such that $I_i^{APP} > I_{THRESHOLD}$, wherein $I_{THRESHOLD}$ represents the threshold importance value. Thus, for example, device fingerprint 636 may be a concatenation of application fingerprints of software applications classified as having high importance (rather than low importance or moderate importance). In some implementations, the order of the application fingerprints in the concatenation may be based on application importance values 632, with the application fingerprints of more important application occurring earlier in device fingerprint 636.

In another example, device fingerprint model 634 may be configured to generate device fingerprint 636 by determining an unordered set (rather than a concatenation) formed by the plurality of application fingerprints of software applications that are associated with respective importance values that exceed a threshold importance value. Thus, device fingerprint model 634 may implement the function $F^{DEVICE}=\{F_0^{APP}, \ldots, F_N^{APP}\}$ for all i such that $I_i^{APP} > I_{THRESHOLD}$. When using a set, rather than a concatenation, to form device fingerprint 636, device fingerprint 636 may be independent of the order in which the application fingerprints are combined to form device fingerprint

636. Accordingly, a comparison of device fingerprints structured as unordered sets may result in more matching device fingerprints than when the fingerprints are structured as concatenations, or ordered sets.

In a further example, device fingerprint model 634 may be configured to generate device fingerprint 636 by processing a plurality of application fingerprints and their corresponding importance values by a machine learning model. Thus, device fingerprint model 634 may implement the function $F^{DEVICE} = f(F_0^{APP}, I_0^{APP}, \ldots, F_N^{APP}, I_N^{APP}, \theta)$, wherein $\theta$ represents parameters of the machine learning model that have been determined by way of a training process. Unlike the concatenation or the formation of the unordered set, the machine learning model may combine, blend, and/or transform the application fingerprints such that the application fingerprints are not explicitly apparent from an examination of device fingerprint 636, but are nevertheless represented by device fingerprint 636.

Figure 7A:
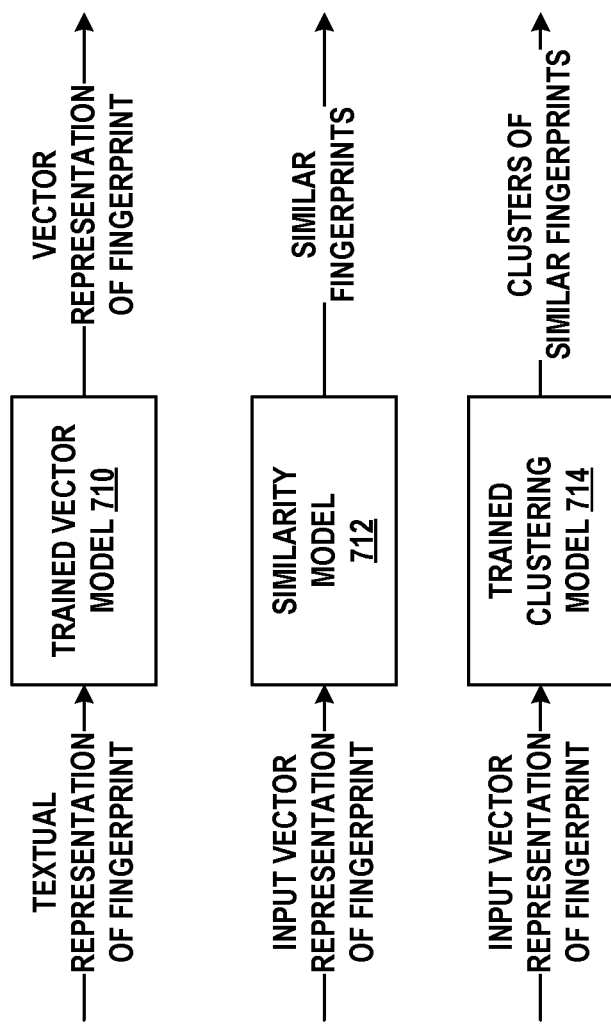
FIGS. 7A and 7B depict aspects of machine learning models, in accordance with example embodiments.

The machine learning model may be trained to generate device fingerprint 636 using a data set that includes a plurality of pairs of (i) application fingerprints and corresponding importance values associated with a given computing device and (ii) a ground-truth metric indicating, for example, a similarity between the given computing device and at least one other computing device, which is also associated with corresponding application fingerprints and importance values. Accordingly, the machine learning model may be trained to generate similar device fingerprints for computing devices that are similar and dissimilar device fingerprints for computing devices that are dissimilar. The ground-truth similarity metric may be generated, for example, based on manual data labeling and/or monitoring of an extent of interaction between computing devices. Additional aspects of machine learning models are illustrated in and discussed with respect to FIGS. 7A and 7B.

Device fingerprint comparator 638 may be configured to determine device relation metric 640 by comparing device fingerprint 636 to reference device fingerprint 606 of reference computing device representation 604. Reference computing device representation 604 may include reference application fingerprints 608 of software applications installed on the reference computing device, and reference device fingerprint 606 may be generated by mapping application 600 based on reference application fingerprints 608. The reference computing device represented by reference computing device representation 604 may be selected from the plurality of computing devices within managed network 300 to be used as a reference, or point of comparison, for other computing devices within managed network 300.

The reference computing device may be selected to be used as a reference based on, for example, the reference computing device including a reference set of software applications that is considered secure, compliant, correct, and/or otherwise desirable. For example, the reference set of software applications may include software applications that are expected to be used by users within managed network 300, and/or may lack software applications or versions thereof that include known security flaws, are intended to be unavailable within managed network 300, and/or are unlicensed, among others. In one example, the reference computing device may be selected based on a review (e.g., by a user) of the software applications installed thereon. In another example, the reference set of software applications may be defined manually, and a computing device that has installed thereon the reference set of software applications (or a set of software applications that is most similar to the reference set) may be automatically selected as the reference computing device.

In some implementations, device relation metric 640 may be a clustering metric that indicates respective computing device cluster(s) to which computing device representation 602 and/or reference computing device representation 604 belong. In some cases, clustering of reference computing device representation 604 and/or computing device representation 602 may depend on the corresponding device fingerprints of a plurality of other computing devices within managed network 300. Accordingly, device fingerprint comparator 638 may be configured to determine a plurality of clusters of the plurality of computing devices within managed network 300 based on a corresponding device fingerprint determined, by device fingerprint model 634, for each respective computing device of the plurality of computing devices. The plurality of clusters may be determined using, for example, k-means clustering, mean-shift clustering, Density-Based Spatial Clustering of Applications with Noise (DBSCAN), Expectation-Maximization (EM) Clustering using Gaussian Mixture Models (GMM), and/or Agglomerative Hierarchical Clustering, among other possibilities. Additional operations related to the clustering-based approach are illustrated in and discussed with respect to FIGS. 8A and 8B.

In other implementations, device relation metric 640 may be a similarity value that indicates a similarity between computing device representation 602 and reference computing device representation 604. In one example, when device fingerprint 636 and reference device fingerprint 606 are character strings, device relation metric 640 may represent the Levenshtein distance between device fingerprint 636 and reference device fingerprint 606, or another measure of difference between two character strings. In another example, when device fingerprint 636 and reference device fingerprint 606 are vectors, device relation metric 640 may represent the Euclidean distance between device fingerprint 636 and reference device fingerprint 606, or another measure of difference between two vectors. Additional operations related to the similarity-based approach are illustrated in and discussed with respect to FIGS. 9A and 9B.

Based on device relation metric 640, application fingerprint comparator 642 may be configured to determine whether software applications of computing device representation 602 and reference computing device representation 604 are to be compared. In one example, when device relation metric 640 is a clustering metric, application fingerprint comparator 642 may be configured to compare application fingerprints 612-622 to reference application fingerprints 608 based on and/or in response to determining that computing device representation 602 and reference computing device representation 604 are part of the same cluster. In another example, when device relation metric 640 is a similarity value, application fingerprint comparator 642 may be configured to compare application fingerprints 612-622 to reference application fingerprints 608 based on and/or in response to determining that the similarity value between computing device representation 602 and reference computing device representation 604 has at least a threshold value.

Thus, application fingerprint comparator 642 may be configured to perform an application-level comparison of computing devices that are related, and may be configured to abstain from performing an application-level comparison of computing devices that are unrelated. Performing a device-level comparison to identify computing devices to be compared at the application level may be beneficial since it may involve fewer comparisons (and thus be faster and/or more efficient) than an indiscriminate application-level comparison among all computing devices within managed network 300. The application-level comparison of related computing devices may be useful in identifying application-level differences that are not expected to be present. Identifying application-level differences between unrelated computing devices may be less useful (and may thus be avoided), since these computing devices are expected to have various application-level differences, and the reference computing device is thus not a meaningful point of comparison for computing devices that are unrelated to it.

Application fingerprint comparator 642 may be configured to determine application disparity 644 between software applications 610-620 and the reference set of software applications installed on the reference computing device based on the applications fingerprints of each of these software applications. Specifically, for each respective application fingerprint of reference application fingerprints 608, application fingerprint comparator 642 may be configured to determine whether a matching application fingerprint is included in application fingerprints 612-622. Application fingerprints present in both reference application fingerprints 608 and in application fingerprints 612-622 may indicate compliant software applications. Application fingerprints present in reference application fingerprints 608 and absent from application fingerprints 612-622 may indicate missing software applications. Additionally, application fingerprint comparator 642 may also be configured to determine whether application fingerprints 612-622 include any fingerprints that are not part of reference application fingerprints 608. Application fingerprints present in application fingerprints 612-622 and absent from reference application fingerprints 608 may indicate unauthorized software applications.

In some implementations, two fingerprints may be considered to match when the two fingerprints are identical. In other implementations, two fingerprints may be considered to match when the two fingerprints differ by no more than a threshold extent. The manner in which the extent of difference is evaluated may vary depending on the format of the application fingerprints. For example, when the application fingerprints are character strings, the Levenshtein distance may be used to quantify the extent of difference and, when the application fingerprints are vectors, the Euclidean distance may be used to quantify the extent of difference, among other possibilities.

In some implementations, application fingerprint comparator 642 may additionally or alternatively be configured to determine application disparity 644 between software applications 610-620 and the reference set of software applications installed on the reference computing device based on the process attributes of these software applications. For example, the application fingerprint of a given reference software application may be compared to application fingerprints 612-622 to identify candidate matches for the given reference software application. The process attributes of the given reference software application may then be compared to the corresponding process attributes of each of the candidate software applications. Accordingly, two representations of two software applications may be considered to match when (i) the corresponding fingerprints of the two software applications match and (ii) when the corresponding process attributes of the two software applications match (e.g., are identical and/or similar). Thus, process attributes 614-624 may provide an additional and/or more detailed basis for comparison of software applications 610-620 to the reference set of software applications of reference computing device representation 604.

Application disparity 644 may be used as a basis for adjusting a configuration of the particular computing device represented by representation 602. For example, disparity 644 may be used to filter representations of software application 610-620 based on whether each representation corresponds to a software application that is compliant, missing, or unauthorized. Accordingly, a user may be able to easily identify (i) software applications that are installed on the particular computing device as intended, (ii) software applications that are not installed on the particular computing device, but should be, and/or (iii) software applications that are installed on the particular computing device, but should not be. Based on this identification, the user may be able to instruct deletion of one or more unauthorized software applications and/or instruct installation of one or more missing software applications.

In some implementations, application disparity 644 may include suggested modifications to software applications 610-620, including suggested deletions of the one or more unauthorized software applications and/or suggested installations of the one or more missing software applications. Mapping application 600 may be configured to provide instructions to display the suggested modifications by way of a user interface (e.g., of a client device). A selection of one or more of the suggested modifications may be received by way of the user interface. Based on and/or in response to reception of the selection of the one or more suggested modifications, mapping application 600, possibly in coordination with other software applications, may be configured to execute the selected modifications, thereby reducing a disparity between the particular computing device and the reference computing device. In other implementations, the suggested modifications may be executed manually by the user.

VI. Example Similarity and Clustering Models

Application importance model 630, device fingerprint model 634, and/or device fingerprint comparator 638 may be based on and/or include one or more machine learning (ML) models. Among other ML-based techniques, the ML models may utilize the classification, similarity, and/or clustering techniques described below as part of the determination of application disparities. Further, there can be overlap between the functionality of these techniques (e.g., clustering techniques can be used for classification or similarity operations). In some cases, device and/or application disparities can be determined by processing device and/or application fingerprints that are based on and/or represented as character strings (i.e., are textual), and the embodiments below assume such textual fingerprints for purposes of illustration. Nonetheless, other types of fingerprint data may be used as the basis for developing and using ML models.

ML techniques can include determining, by artificial neural networks (ANNs) and/or other deep learning algorithms, vector representations of fingerprint (e.g., application fingerprints and/or device fingerprints) from process attributes represented as character strings. These techniques are used to determine a similarity between fingerprints, to group multiple fingerprints together, to determine statistical associations between fingerprints, and/or to perform some other fingerprint processing task.

A fingerprint vector may include, be based on, and/or be represented using one or more word vectors associated with one or more character strings (which may be considered to form words) contained in the process attributes on which the fingerprint is based. A word vector may be determined for each word present in a corpus of textual records such that words having similar meanings (or semantic content) are associated with word vectors that are near each other within a semantically encoded vector space. Such vectors may have dozens, hundreds, or more elements and thus may be an n-space where n is a number of dimensions. These word vectors allow the underlying meaning of words to be compared or otherwise operated on by a computing device (e.g., by determining a distance, a cosine similarity, or some other measure of similarity between the word vectors). Since the corpus of textual records may be based on process attributes of software applications and/or other computer-generated character strings, some of the words may be non-dictionary words that have semantic meaning in the context of one or more computing devices and/or systems, but that might not be meaningful outside of this context.

Additionally or alternatively, the word vectors may be provided as input to an ANN, a support vector machine, a decision tree, or some other machine learning algorithm in order to classify or cluster corresponding software applications and/or computing devices, to determine a level of similarity between corresponding software applications and/or computing devices, and/or to perform some other processing task with respect to corresponding software applications and/or computing devices.

Despite the usefulness of word vectors, the complete semantic meaning of a multi-word character string representing, for example, a relatively long process attribute and/or a collection of multiple process attributes (e.g., the set of all process attributes of a given software application) cannot always be captured from the individual word vectors of the process attribute(s) (e.g., by applying vector algebra). Word vectors can represent the semantic content of individual words and may be trained using short context windows. Thus, the semantic content of word order and any information outside the short context window is lost when operating based only on word vectors.

Similar to the methods above for learning word vectors, an ANN or other ML models may be trained using a large number of paragraphs (i.e., multi-word character strings) in a corpus to determine the contextual meaning of entire paragraphs and/or other multi-word text samples, as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs.

Word vectors and paragraph vectors are two approaches for training an ANN model to represent the sematic meanings of character strings representing process attributes. Variants of these techniques, e.g., using continuous bag of words, skip-gram, paragraph vector—distributed memory, paragraph vector—distributed bag of words, may also be used. Additionally or alternatively, other techniques, such as bidirectional encoder representations from transformers (BERT), may be used for example. These techniques may be combined with one another or with other techniques.

As an example, vector models can be trained using word vector or paragraph vector techniques for example. To that point, trained vector model 710 in FIG. 7A, takes as input a textual representation of a fingerprint and produces a vector representation of the fingerprint. This vector representation encodes the sematic meaning of the input text by projecting the input text into n-dimensional space. Similar units of input text will likely have similarly-located vector representations in the n-dimensional space.

For example, the textual representation of an application fingerprint may be the character string(s) that represent corresponding process attributes (e.g., process attributes 614 or a subset thereof), and the vector representation may be the application's fingerprint itself (e.g., application fingerprint 612). As another example, the textual representation of a device fingerprint may be the plurality of application fingerprints (e.g., fingerprints 612-622), each represented as text, of software applications (e.g., software applications 610-620) installed on the corresponding computing device (e.g., represented by computing device representation 602), and the vector representation may be the device fingerprint itself (e.g., device fingerprint 636).

Accordingly, similarity model 712 takes an input vector representation of a fingerprint and produces zero or more similar fingerprints. As noted above, the degree of similarity between two fingerprints can be determined by calculating a similarity measurement between their respective vector representations. One such measurement may be based on cosine similarity, which is defined by the following equations:

$$\text{similarity}\left(\vec{A}, \vec{B}\right) = \frac{\vec{A} \cdot \vec{B}}{\|\vec{A}\|\|\vec{B}\|}$$

$$\text{where } \|\vec{A}\| = \sqrt{A_1^2 + A_2^2 + A_3^2 + \ldots + A_n^2}, \text{ and}$$

$$\|\vec{B}\| = \sqrt{B_1^2 + B_2^2 + B_3^2 + \ldots + B_n^2}$$

In these equations, vector A could represent one input vector and vector B could represent another input vector. Vector A and vector B could both be of dimension n. The similarity calculation may have an output a number between −1 and +1, where the closer this result is to +1, the more similar vectors A and B are to each other.

Thus, the similar fingerprints produced by similarity model 712 may be those with vector representations for which the respective cosine similarities with the input vector representation of the fingerprint are above a threshold value. Alternatively, the output of similar records may be a certain (e.g., predetermined) number of fingerprints (or identifiers thereof) for which the respective cosine similarities with the input vector representation of the fingerprint are the most similar.

The similarity calculations described above may also be used to cluster similar fingerprints. Such clustering may be performed to provide a variety of benefits. For example, clustering may be applied to a set of fingerprints in order to identify patterns or groups within the set of fingerprints that have relevance to the operation of a system or organization. Such groups may facilitate the tracking of application and/or device configuration changes by measuring a time-dependence of fingerprints assigned to a particular cluster. Additionally, such groups may facilitate the early identification of unauthorized and/or missing software applications. In some examples, clustering may allow similar applications and/or devices (e.g., applications and/or devices corresponding to the same clusters) to be manipulated in common, in order to reduce the time required to carry out a desired modification.

Clustering may be performed in an unsupervised manner in order to generate clusters without the requirement of manually-labeled fingerprints, to identify previously unidentified clusters within the fingerprints, or to provide some other benefit. A variety of methods and/or ML algorithms could be applied to identify clusters within a set of fingerprints and/or to assign fingerprints (e.g., fingerprints of newly-discovered applications and/or devices) to already-identified clusters. For example, decision trees, ANNs, k-means, support vector machines, independent component analysis, principal component analysis, or some other method could be trained based on a set of available fingerprints in order to generate an ML model to classify the available fingerprints and/or to classify fingerprints not present in the training set of available fingerprints.

For instance, leveraging the vector representations described herein, fingerprints can be clustered based on the semantic meanings of their textual representation(s). Clusters may be identified, for example, to include vector representations that are within a particular extent of similarity from one another, or not more than a particular Euclidian distance from a centroid in n-space. In these models, some outlying vector representations may remain unclustered.

Once an ML model has been determined, the ML model can be applied to assign additional fingerprints to the identified clusters represented by the ML model and/or to assign fingerprints to a set of residual fingerprints. The ML model could include parameter values, neural network hyperparameters, cluster centroid locations in feature space, cluster boundary locations in feature space, threshold similarity values, or other information used, by the ML model, to determine which cluster to assign a fingerprint and/or to determine that the fingerprint should not be assigned to a cluster (e.g., should be stored in a set of residual, unassigned fingerprints). Such information could define a region, within a feature space, that corresponds to each cluster. That is, the information in the ML model could be such that the ML model assigns a fingerprint to a particular cluster if the features of the fingerprint correspond to a location, within the feature space, that is inside the defined region for the particular cluster. The defined regions could be closed (being fully enclosed by a boundary) or open (having one or more boundaries but extending infinitely outward in one or more directions in the feature space).

Trained clustering model 714 depicts such an arrangement in general. Particularly, trained clustering model 714 takes an input vector representation of a fingerprint and identifies a cluster of similar fingerprints (if one exists). To the extent that clusters overlap in the model, more than one cluster can be identified. The cluster or clusters may be determined based on similarity calculations (e.g., cosine similarities) between the input vector representation of the fingerprint and other fingerprints in the cluster of a centroid of the cluster, for example.

Figure 7B:
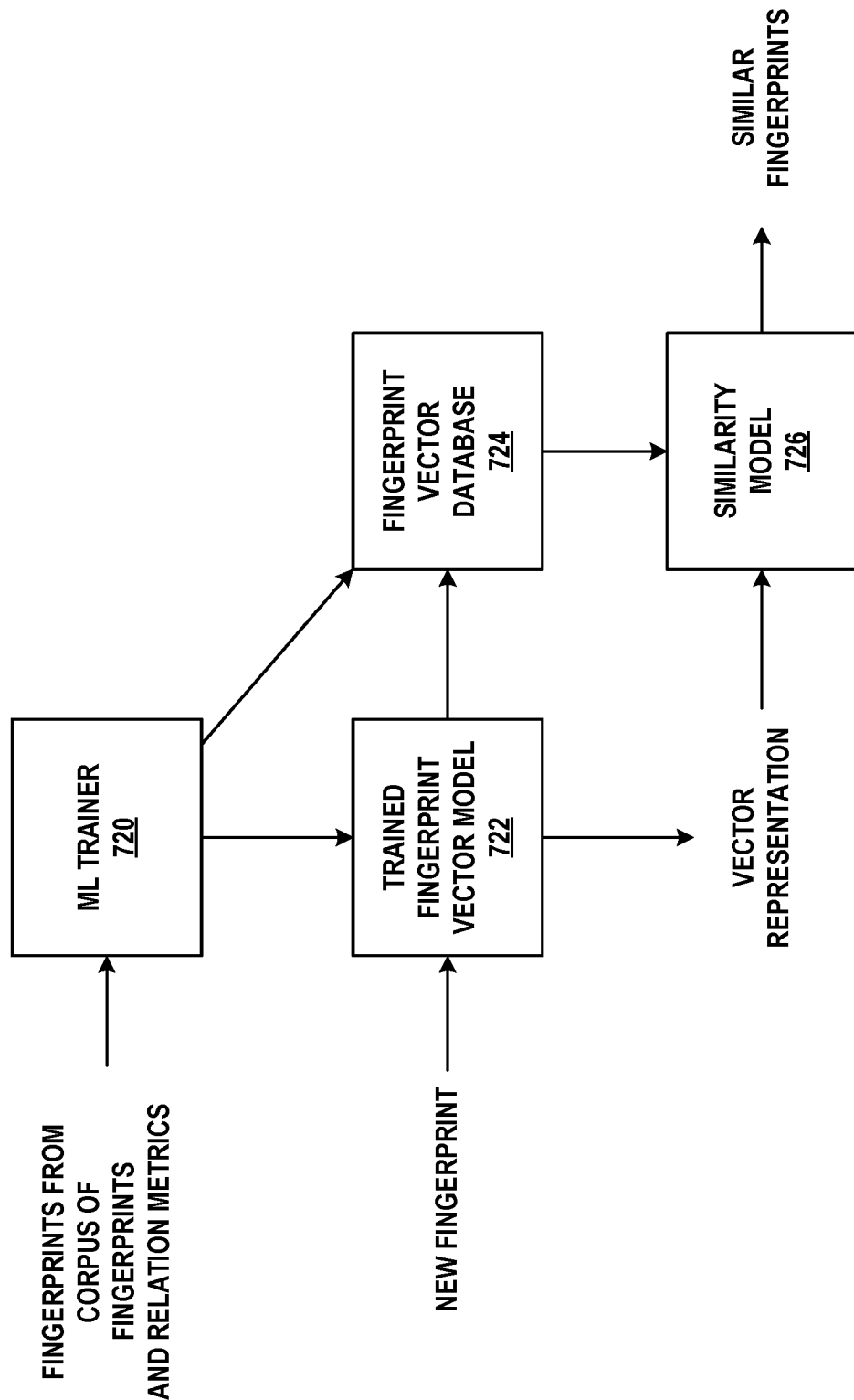

FIG. 7B depicts an example of these models in practice. ML trainer 720 may include an ML model taking fingerprints from a corpus of fingerprints and relation metrics, and producing trained fingerprint vector model 722. Trained fingerprint vector model 722 may include a word vector model and/or a paragraph vector model, as described above, and may correspond to trained vector model 710. Specifically, each respective fingerprint in the corpus may be associated with a corresponding relation metric indicating a similarity of the respective fingerprint to at least one other fingerprint. Thus, the corpus may constitute training data that maps pairs of fingerprints to corresponding relation metrics (e.g., similarity values, clusters, etc.).

In one example, the similarity metric may be applied to the fingerprint manually by a user based on the user's assessment of a strength and/or extent of relatedness between two applications and/or devices. In another example, the similarity metric may be based on an amount of communication exchanged between the application and/or device represented by the fingerprint and another application and/or device represented by the at least one other fingerprint. In a further example, the similarity metric may be based on an extent of co-occurrence of the application and the other application on the same device(s), and/or an extent of co-occurrence of a given software application on the device and the other device. In a yet further example, the similarity metric may be based on a proximity, within a discovery-based map of managed network 300, between the application and/or device and the other application and/or device. Other approaches to determining the similarity metric are possible.

ML trainer 720 may also produce fingerprint vector database 724 as part of the training process. Thus, fingerprint vector database 724 may contain one vector representation per fingerprint in the corpus (e.g., if the corpus contains k fingerprints, there may be k vector representations, one for each fingerprint).

In some examples, trained fingerprint vector model 722 could take a new fingerprint as input and produce a vector representation of this fingerprint. This vector representation may be stored in memory and/or provided as input to similarity model 726. In some embodiments, fingerprint vector database 724 may be produced by providing fingerprints in the corpus to trained fingerprint vector model 722 and storing their respective vector representations as fingerprint vector database 724. Additionally or alternatively, fingerprint vector database 724 may be produced by providing a plurality of new fingerprints (e.g., representing computing devices and/or applications of managed network 300) to trained fingerprint vector model 722 and storing their respective vector representations as fingerprint vector database 724.

Similarity model 726 may take this vector representation as input, retrieve one or more stored vector representations from fingerprint vector database 724, and calculate similarity measures (e.g., cosine similarities) between the vector representation and one or more vector representations retrieved from fingerprint vector database 724. These similarity measures may be used to identify fingerprints from the corpus that are similar to the fingerprint from which the vector representation was derived. For example, if vector representation v1 derived from fingerprint r1 is determined to be similar to fingerprint representation v2 derived from fingerprint r2, then it can be concluded that there is a semantic similarity between fingerprint r1 and fingerprint r2. It should be noted that these inputs, outputs, and models are provided for example and other inputs, outputs, and model architectures may be possible.

VII. Example Clustering-Based Operations

Figure 8A:
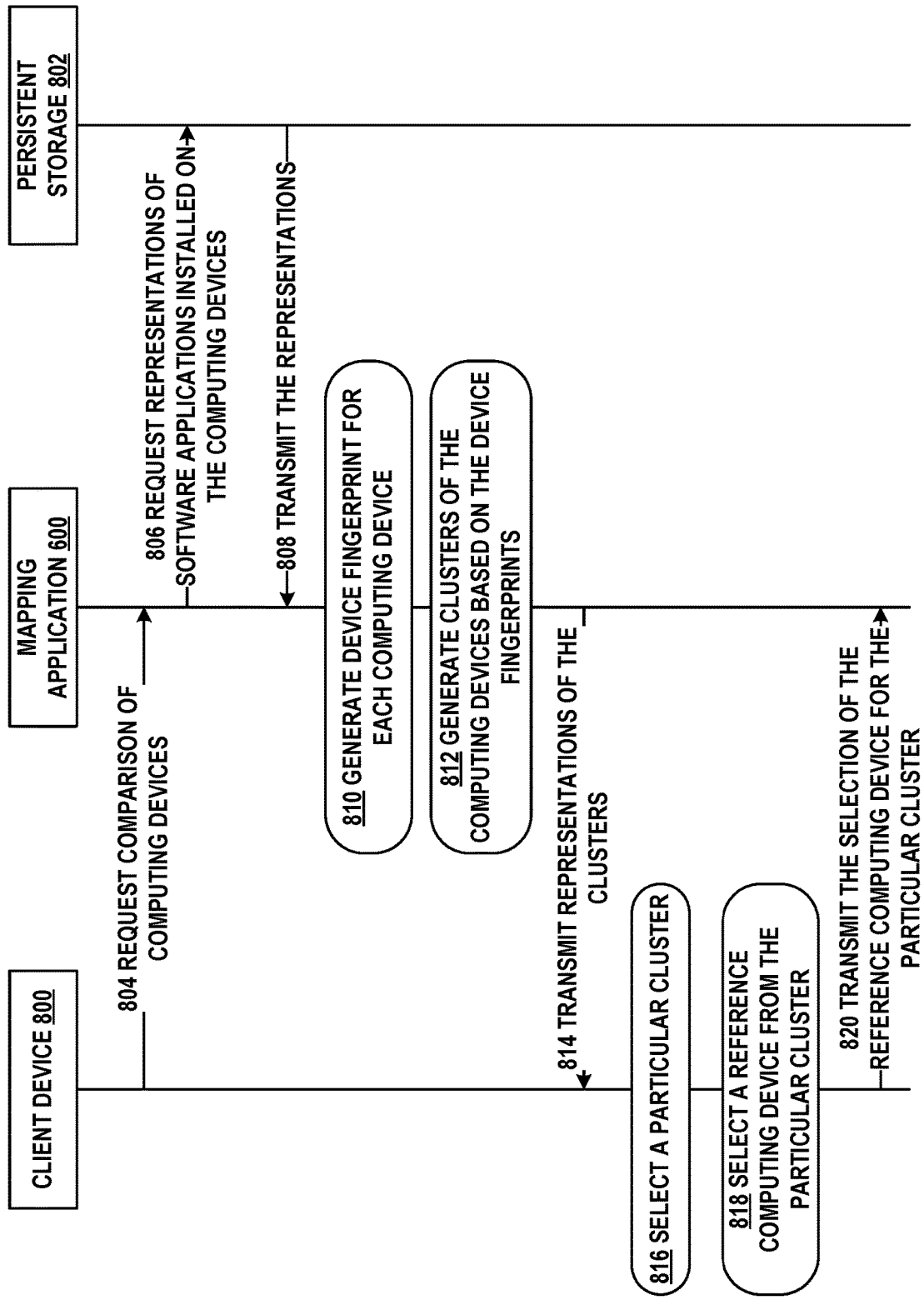
FIGS. 8A and 8B are message flow diagrams, in accordance with example embodiments.
Figure 8B:
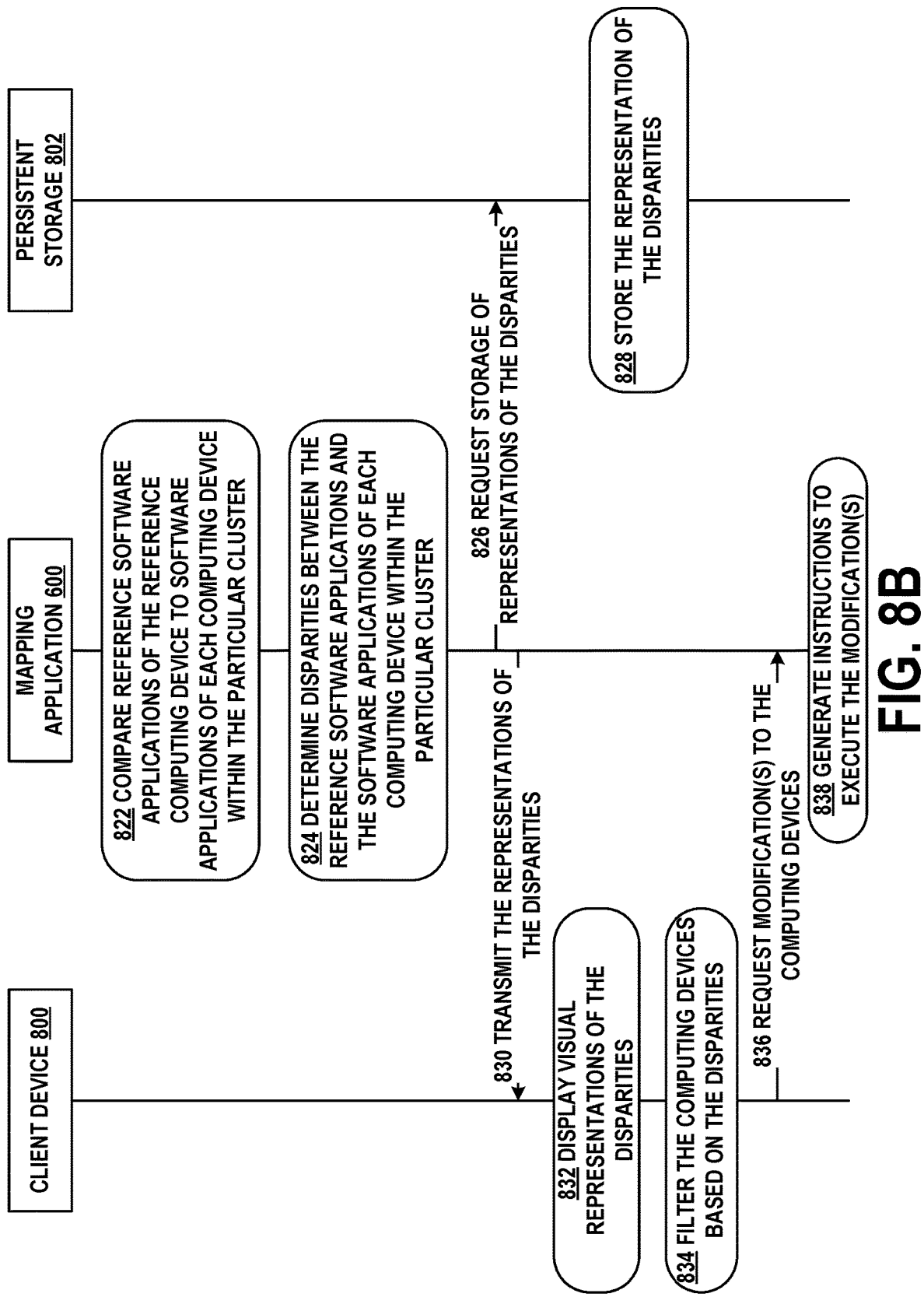

FIGS. 8A and 8B illustrate example operations related to determining disparities between computing devices based on a clustering of the computing devices according to their respective device fingerprints. Specifically, FIGS. 8A and 8B illustrate operations of client device 800, mapping application 600, and persistent storage 802. Client device may be a computing device configured to communicate with and/or control aspects of mapping application 600. In some cases, client device 800 may be disposed within managed network 300, which may undergo discovery and/or mapping by mapping application 600. Persistent storage 802 may be configured to store representations of computing devices (e.g., 602), software applications (e.g., 610-620) installed on the computing devices, application fingerprints (e.g., 612-622) of the software applications, and/or process attributes (e.g., 614-624) of the software applications, among other data. Mapping application 600 and/or persistent storage 802 may be disposed in remote network management platform 320.

Client device 800 may be configured to transmit, to mapping application 600, a request for comparison of computing devices, as indicated by arrow 804. The request at arrow 804 may specify, for example, a subset of the computing devices within managed network 300 for which device fingerprints are to be determined in order to gauge the compliance of these computing devices. In some cases, this request may be transmitted after representations of at least the subset of the computing devices have been stored in persistent storage 802 by discovery and/or mapping processes.

Based on and/or in response to reception of the request at arrow 804, mapping application 600 may be configured to transmit, to persistent storage 802, a request for representations of software applications installed on the computing devices, as indicated by arrow 806. Alternatively, in some implementations, the request of arrow 804 may be omitted, and the operations of arrow 806 may instead be executed, for example, based on and/or in response to completion of discovery and/or mapping operations. Based on and/or in response to reception of the request at arrow 806, persistent storage 802 may be configured to transmit, to mapping application 600, the representations, as indicated by arrow 808. The transmission at arrow 808 may include, for each computing device identified at arrow 806, a representation similar to representation 602 shown in FIG. 6.

Based on and/or in response to reception of the representations at arrow 808, mapping application 600 may be configured to generate (e.g., using application importance model 630 and/or device fingerprint model 634), for each respective computing device, a corresponding device fingerprint, as indicated by block 810. Based on and/or in response to generating a corresponding device fingerprint for each respective computing device at block 810, mapping application 600 may be configured to generate (e.g., using device fingerprint comparator 638 and/or trained clustering model 714) a plurality of clusters of the computing devices based on the device fingerprints, as indicated by block 812. In some implementations, the number of clusters may be determined automatically by mapping application 600. In other implementations, the number of clusters may be specific as part of the request at arrow 804.

Based on and/or in response to generation of the clusters at block 812, mapping application 600 may be configured to transmit, to client device 800, representations of the plurality of clusters, as indicated by arrow 814. Reception of the representations of the clusters at arrow 814 may be configured to cause client device 800 to display visual representations of the clusters. In one example, each respective cluster may be visually represented as a section of a pie chart, with the size of the section being proportional to a number of computing devices in the respective cluster. In another example, each respective cluster may be visually represented as a node, with the size of the node being proportional to a number of computing devices in the respective cluster. By displaying visual representations of the clusters, a user of client device 800 may be provided with logical groupings of computing devices that share at least come common characteristics.

Based on and/or in response to reception of the representations of the clusters at arrow 814 and/or display thereof, client device 800 may be configured to obtain a selection of a particular cluster of the plurality of clusters, as indicated by block 816. Based on and/or in response to selection of the particular cluster at block 816, client device 800 may be configured to obtain a selection of a reference computing device from the particular cluster, as indicated by block 818. Alternatively, in some implementations, selection of the reference computing device may operate as an indirect selection of the particular cluster to which the reference computing device belongs (i.e., block 816 may be a subset of block 818). Based on and/or in response to selection of the reference computing device at block 818, client device 800 may be configured to transmit, to mapping application 600, the selection of the reference computing device for the particular cluster, as indicated by arrow 820.

Thus, in the example shown in FIGS. 8A and 8B, selection of logically-related computing devices may precede and/or facilitate selection of a reference computing device. Such operations may be employed in cases where a user might not be aware of the organizational structure of computing devices and/or software applications within managed network 300, and thus may benefit from evaluating the clusters and their compositions before selecting the reference computing device.

The selected reference computing device (e.g., corresponding to representation 604) may represent, include, and/or be associated with a target set of software applications (or at least an approximation thereof) that one or more other computing devices within the particular cluster are also desired and/or expected to have installed thereon. That is, the selected reference computing device may be a model and/or standard to which other computing devices within the cluster are to be compared in order to determine whether these other computing devices match the model and/or standard, and/or to determine the extent to which these other computing devices deviate from the model and/or standard. By generating clusters of the computing devices, the application-level comparison with the selected reference computing device may be scoped to computing devices in the particular cluster, rather than all computing devices within managed network 300. Thus, the comparison may be performed faster and/or using fewer computing resources.

Turning to FIG. 8B, based on and/or in response to reception of the transmission at arrow 820, mapping application 600 may be configured to compare (e.g., using application fingerprint comparator 642) reference software applications of the reference computing device to software applications of each computing device within the particular cluster, as indicated by block 822. Based on and/or in response to the application-level comparison at block 822, mapping application 600 may be configured to determine (e.g., using application fingerprint comparator 642) disparities between the reference software applications and the software applications of each computing device within the particular cluster, as indicated by block 824. The disparities may indicate ways in which the computing devices in the particular cluster differ from the reference computing device for the cluster, thus allowing for the software applications of the computing devices to be adjusted to more closely match the reference software applications.

Based on and/or in response to determination of the disparities at block 824, mapping application 600 may be configured to transmit, to persistent storage 802, a request for storage of representations of the disparities, as indicated by arrow 826. Based on and/or in response to reception of the request at arrow 826, persistent storage 802 may be configured to store the representations of the disparities, as indicated by block 828. The representations of the disparities may be retrieved at a later time (e.g., by client device 800) and used as a basis for identifying and making adjustments to the computing devices.

Additionally, based on and/or in response to determination of the disparities at block 824, mapping application 600 may be configured to transmit, to client device 800, the representations of the disparities, as indicated by arrow 830. Alternatively or additionally, the operations of arrow 830 may be performed at a later time in response to a request, from client device 800, for the representations, which may be retrieved from persistent storage 802 by mapping application 600. Based on and/or in response to reception of the representations at arrow 830, client device 800 may be configured to display visual representations of the disparities, as indicated by block 832.

The visual representations of the disparities may be structured so as to facilitate identification of commonalities and/or differences between the reference computing device and the computing devices compared thereto. For example, compliant software applications may be indicated using a first color (and/or shown in a first table), missing software applications may be indicated using a second color (and/or shown in a second table), and/or unauthorized software applications may be indicated using a third color (and/or shown in a third table). Other visual representations are possible.

Based on and/or in response to displaying the visual representations at block 832, client device 800 may be configured to obtain, from the user, a selection of one or more filter parameters, and may filter the computing devices accordingly, as indicated by block 834. For example, the user may indicate that the user interface is to display unauthorized software applications and/or missing software applications, but is not to display compliant software applications, so that the user can determine how to improve compliance of the relevant computing devices.

Based on and/or in response to filtering of the computing devices at block 834, client device 800 may be configured to transmit, to mapping application 600, a request for one or more modifications to the computing devices, as indicated by arrow 836. The request may be based on, for example, a user selection of one or more software applications to be deleted and/or one or more software applications to be installed on corresponding computing devices.

Based on and/or in response to reception of the request at arrow 836, mapping application 600 may be configured to generate instructions to execute the one or more modifications, as indicated by block 838. In one example, the instructions may include written instructions addressed to one or more programmers, administrators, and/or other users within managed network 300 requesting manual execution of the one or more modifications. In another example, the instructions may include software instructions configured to cause automated execution of the one or more modifications by the corresponding computing devices. For example, the instructions may include scripts configured to install and/or uninstall relevant software applications from the corresponding computing devices. Thus, execution of the modifications, as indicated by block 838, may operate to reduce the disparities determined at block 834, thereby bringing computing devices within managed network 300 closer to a desired/target state and/or configuration.

In some cases, another similarity evaluation between the software applications of the reference computing device and those of the computing devices in the particular cluster may be performed. This further evaluation may be to verify that the disparity has decreased, at least to a predetermined level that is acceptable.

VIII. Example Similarity-Based Operations

Figure 9A:
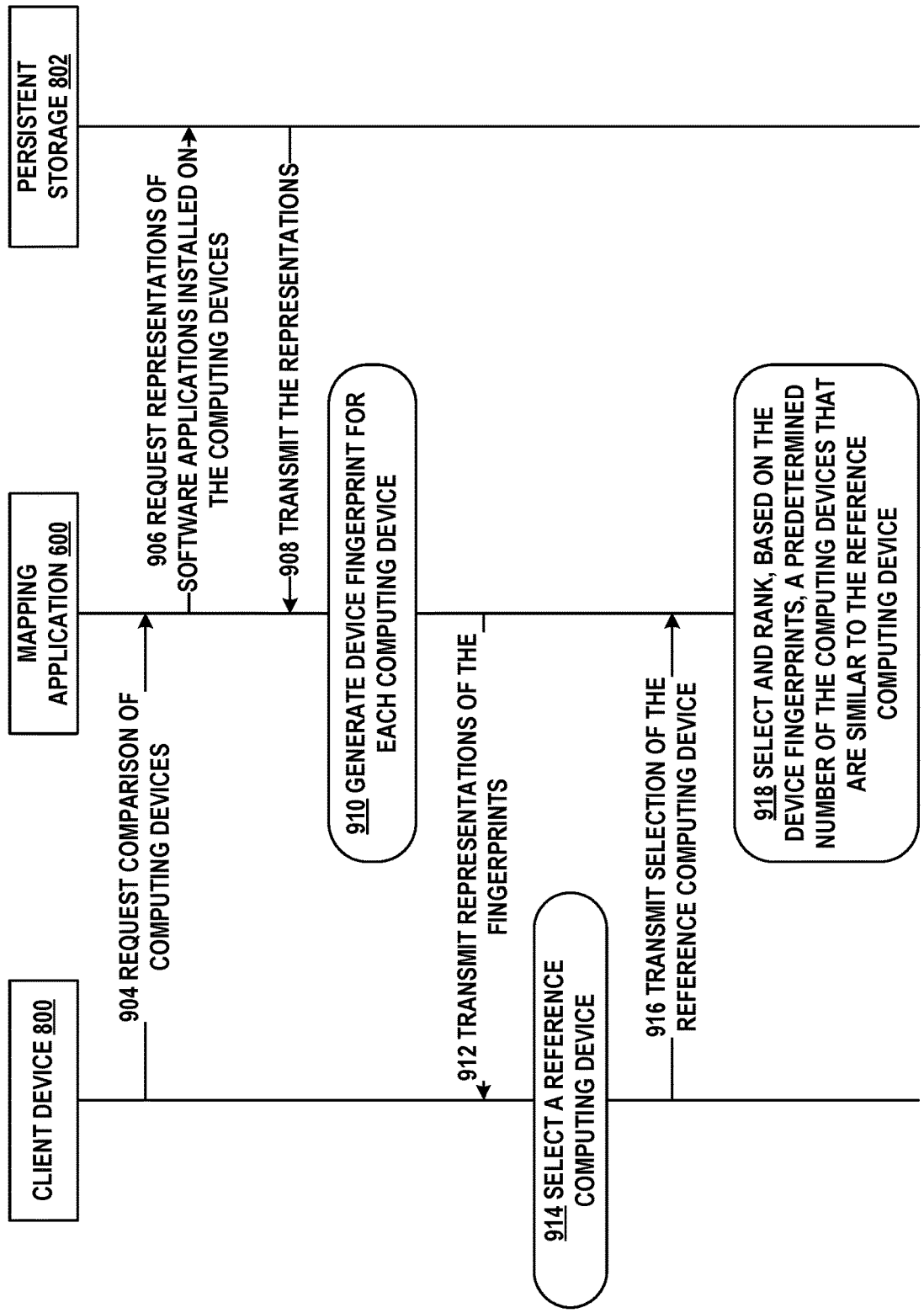
FIGS. 9A and 9B are message flow diagrams, in accordance with example embodiments.
Figure 9B:
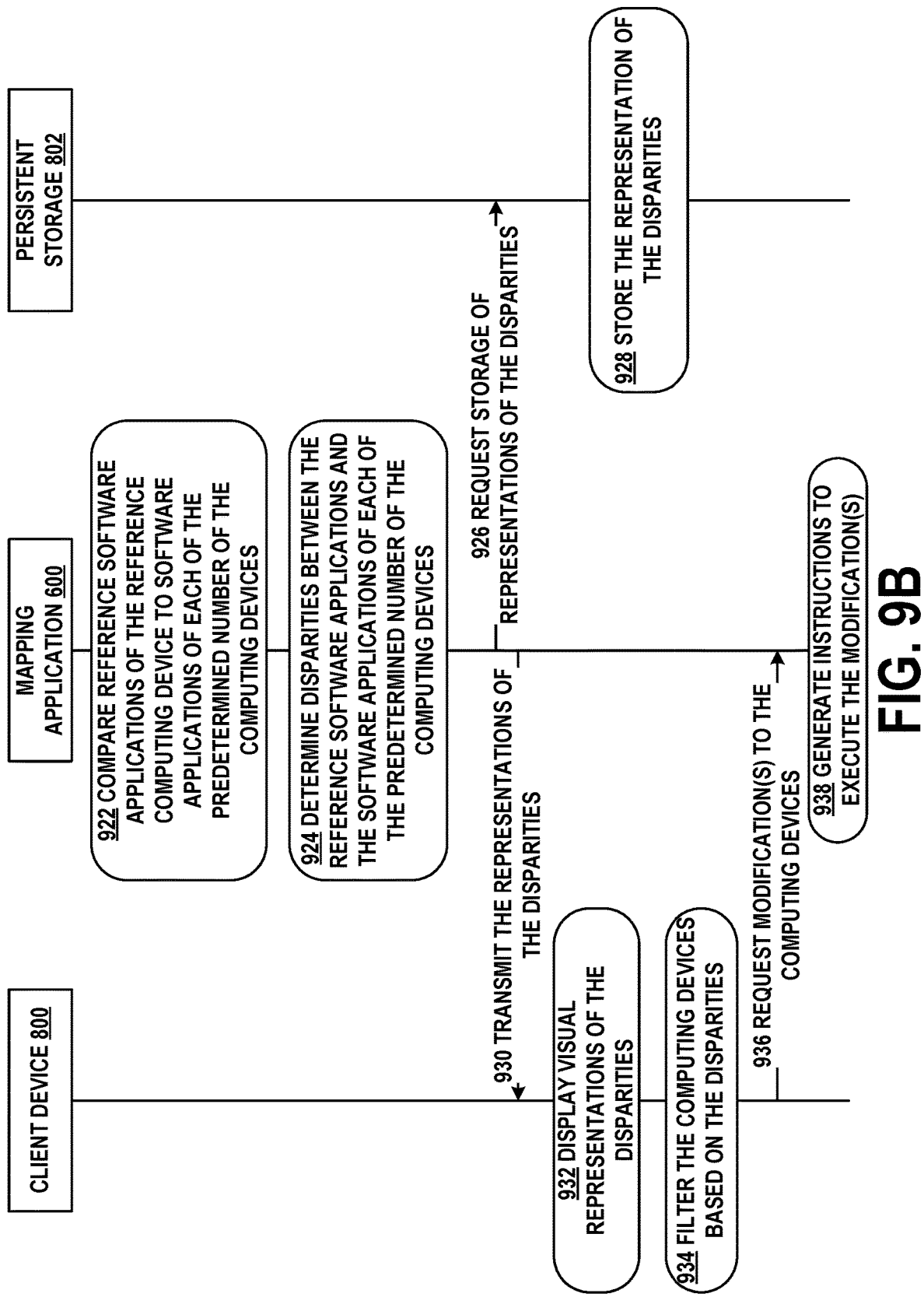

FIGS. 9A and 9B illustrate example operations related to determining disparities between computing devices based on a similarities between the computing devices determined based on their respective device fingerprints. The operations of arrows 904, 906, and 908 and block 910 are commensurate with those of arrows 804, 806, and 808 and block 810, respectively, of FIG. 8A. Based on and/or in response to generation of the device fingerprints at block 910, mapping application 600 may be configured to transmit, to client device 800, representations of the fingerprints and/or the computing devices, as indicated by arrow 912. Reception of the representations of the device fingerprints and/or the computing devices at arrow 912 may be configured to cause client device 800 to display visual representations of the device fingerprints and/or the computing devices, thus informing a user of the scope of computing devices that have been fingerprinted.

Based on and/or in response to reception of the representations of the fingerprints at arrow 912, client device 800 may be configured to obtain a selection of a reference computing device from the plurality of computing devices represented by the device fingerprints, as indicated by block 914. Based on and/or in response to reception of the selection at block 914, client device 800 may be configured to transmit, to mapping application 600, the selection of the reference computing device, as indicate by arrow 916.

Based on and/or in response to reception of the selection at arrow 916, mapping application 600 may be configured to select and rank (e.g., using device fingerprint comparator 638 and/or similarity model 712), based on the device fingerprints, up to a predetermined number of computing devices that are similar to the reference computing device, as indicated by block 918. The predetermined number of computing devices may be used, for example, to scope results of the subsequent comparisons to a manageable (e.g., for a human user) number of devices. The predetermined number may be specified and/or modified by way of client device 800.

Determining the ranking of the computing devices may involve, for example, ranking the computing devices from most similar to least similar. Additionally or alternatively, determining the ranking of the computing device may involve including in the ranked list computing devices associated with corresponding similarity values that exceed a threshold similarity value, and excluding from the ranked list computing devices associated with corresponding similarity values that are equal to or below the threshold similarity value.

In the example shown in FIGS. 9A and 9B, selection of a reference computing device may precede and/or facilitate selection of other logically-related computing devices for comparison to the reference computing device. Such operations may be employed in cases where a user is aware of the organizational structure of computing devices and/or software applications within managed network 300, and thus is able to select the reference computing device without reliance on evaluation of the clusters and their compositions.

Turning to FIG. 9B, based on and/or in response to selecting and ranking the computing devices at block 918, mapping application 600 may be configured to compare reference software applications of the reference computing device to software applications of each of the predetermined number of computing devices, as indicated by block 922. Accordingly, due to the ranking, similar computing devices may be included in, and dissimilar computing devices may be excluded from, the application-level comparison with the reference computing device. Thus, the ranking of computing devices relative to the reference computing device may serve a similar function as clustering of computing devices.

Based on and/or in response to the comparison at block 922, mapping application 600 may be configured to determine disparities between the reference software applications and the software applications of each of the predetermined number of computing devices, as indicated by block 924. Thus, the operations of block 924 may be similar to the operations of block 824, with the exception that the reference computing device and the other computing devices to which the reference computing device is compared have been selected using a difference process. Further, the operations of arrows 926, 930, and 936 and blocks 928, 932, 934, and 938 are commensurate with the operations of arrows 826, 830, and 836 and blocks 828, 832, 834, and 838, respectively.

IX. Example Operations

Figure 10:
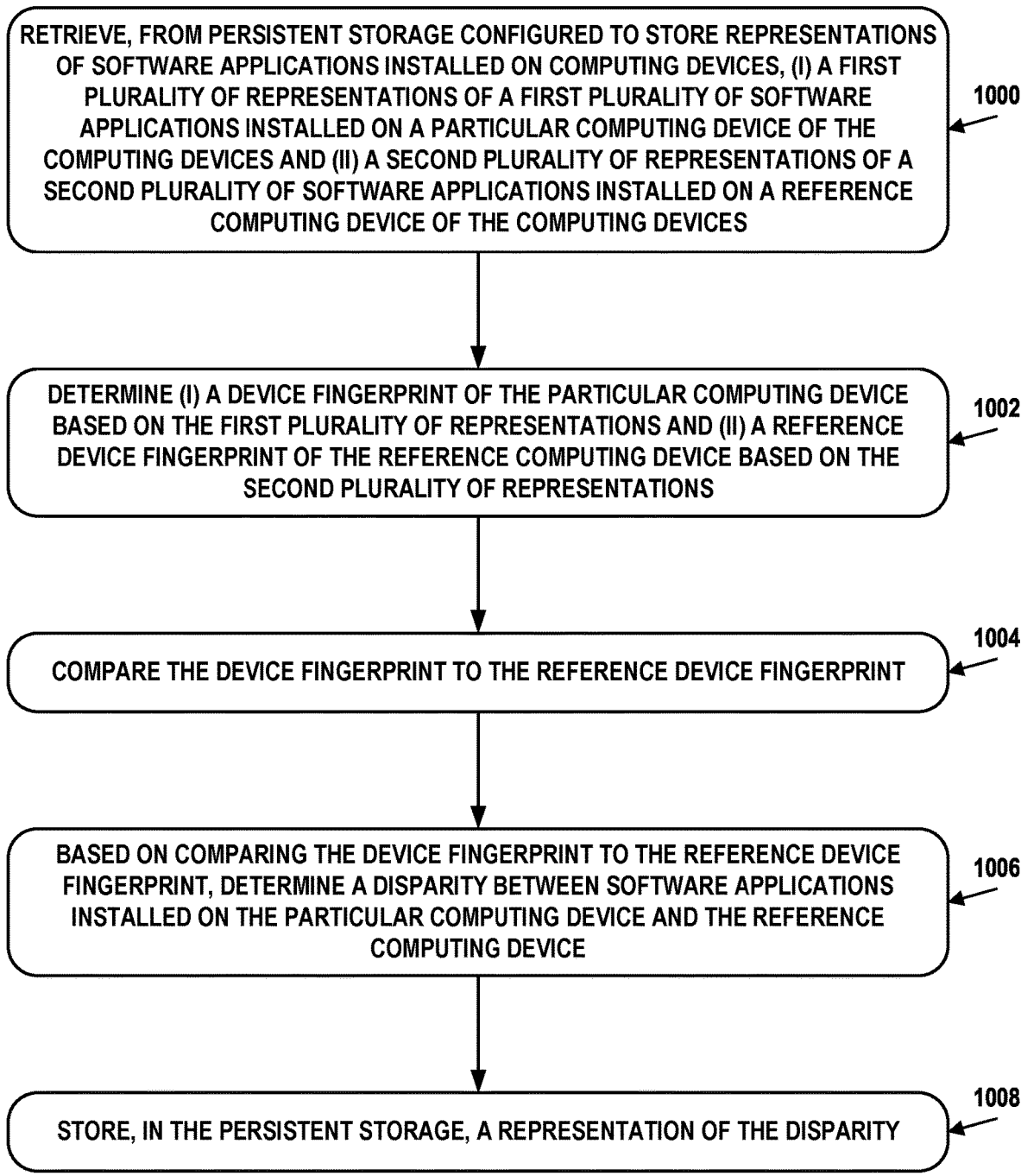
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve retrieving, from persistent storage configured to store representations of software applications installed on computing devices, (i) a first plurality of representations of a first plurality of software applications installed on a particular computing device of the computing devices and (ii) a second plurality of representations of a second plurality of software applications installed on a reference computing device of the computing devices.

Block 1002 may involve determining (i) a device fingerprint of the particular computing device based on the first plurality of representations and (ii) a reference device fingerprint of the reference computing device based on the second plurality of representations.

Block 1004 may involve comparing the device fingerprint to the reference device fingerprint.

Block 1006 may involve, based on comparing the device fingerprint to the reference device fingerprint, determining a disparity between software applications installed on the particular computing device and the reference computing device.

Block 1008 may involve storing, in the persistent storage, a representation of the disparity.

In some embodiments, retrieving the first plurality of representations and the second plurality of representations may include retrieving, for each respective computing device of the computing devices, a corresponding plurality of representations of a corresponding plurality of software applications installed on the respective computing device. Determining the device fingerprint and the reference device fingerprint may include determining, for each respective computing device, a corresponding device fingerprint based on the corresponding plurality of representations. Comparing the device fingerprint to the reference device fingerprint may include determining, based on the corresponding device fingerprint determined for each respective computing device, two or more clusters of the computing devices. A first cluster of the two or more clusters may include the particular computing device and the reference computing device. A selection of the first cluster may be obtained, and a selection of the reference computing device from the first cluster may be obtained.

In some embodiments, determining the disparity between software applications installed on the particular computing device and the reference computing device may include determining, for each respective computing device that is part of the first cluster, a corresponding disparity between software applications installed on the respective computing device that is part of the first cluster and the reference computing device.

In some embodiments, retrieving the first plurality of representations and the second plurality of representations may include retrieving, for each respective computing device of the computing devices, a corresponding plurality of representations of a corresponding plurality of software applications installed on the respective computing device. Determining the device fingerprint and the reference device fingerprint may include determining, for each respective computing device, a corresponding device fingerprint based on the corresponding plurality of representations. A selection of the reference computing device from the computing devices may be obtained. Comparing the device fingerprint to the reference device fingerprint may include, based on obtaining the selection of the reference computing device, determining, for each respective computing device, a similarity value indicative of an extent of similarity between the respective computing device and the reference computing device.

In some embodiments, determining the disparity between software applications installed on the particular computing device and the reference computing device may include determining, for each respective computing device having a similarity value that exceeds a threshold similarity value, a corresponding disparity between software applications installed on the respective computing device and the reference computing device.

In some embodiments, comparing the device fingerprint to the reference device fingerprint may include determining a ranking of the computing devices based on the similarity value determined for each respective computing device. The representations of computing devices that have similarity values that exceed the threshold similarity value may be displayed arranged according to the ranking.

In some embodiments, determining the disparity between software applications installed on the particular computing device and the reference computing device may include identifying a compliant software application that is installed on both the particular computing device and the reference computing device, identifying a missing software application that is installed on the reference computing device but is not installed on the particular computing device, or identifying an unauthorized software application that is installed on the particular computing device but is not installed on the reference computing device.

In some embodiments, the representation of the disparity may be retrieved from the persistent storage. A selection of a category may be received, the selection including at least one of: (i) a compliant category corresponding to the compliant software application, (ii) a missing category corresponding to the missing software application, or (iii) an unauthorized category corresponding to the unauthorized software application. The first plurality of representations may be filtered based on the category. Results of the filtering may be caused to be displayed.

In some embodiments, the representation of the disparity may be retrieved from the persistent storage. A visual representation of the disparity and one or more suggested modifications to the first plurality of software applications may be displayed by way of a user interface. Based on displaying the visual representation of the disparity and the one or more suggested modifications, instructions to execute at least one suggested modification of the one or more suggested modifications may be received by way of the user interface.

In some embodiments, determining the disparity between software applications installed on the particular computing device and the reference computing device may include comparing the first plurality of representations to the second plurality of representations, and determining the disparity between software applications installed on the particular computing device and the reference computing device based on comparing the first plurality of representations to the second plurality of representations.

In some embodiments, comparing the first plurality of representations to the second plurality of representations may include comparing attributes of software processes associated with the first plurality of representations to corresponding attributes of software processes associated with the second plurality of representations. The attributes may include one or more of: (i) a name of a corresponding software process, (ii) a name of an executable file used to cause execution of the corresponding software process, (iii) a file system path indicative of a location of the executable file, (vi) a command used to cause execution of the corresponding software process, or (v) one or more arguments provided as input to the corresponding software process.

In some embodiments, each respective representation of the representations may have been generated by a machine learning algorithm based on attributes of one or more software processes associated with a corresponding software application.

In some embodiments, determining the device fingerprint and the reference device fingerprint may include determining a corresponding importance value for each respective software application of the first plurality of software applications and the second plurality of software applications. A first set of one or more representations of one or more software applications having corresponding importance values that exceed a threshold value may be selected from the first plurality of representations. A second set of one or more representations of one or more software applications having corresponding importance values that exceed the threshold value may be selected from the second plurality of representations. The device fingerprint may be determined based on the first set of one or more representations. The reference device fingerprint may be determined based on the second set of one or more representations.

In some embodiments, determining the corresponding importance value may include determining, for each respective software application of the first plurality of software applications, (i) a corresponding first frequency associated with execution of the respective software application on the particular computing device and (ii) a corresponding second frequency associated with execution of the respective software application across the computing devices, and determining, for each respective software application of the second plurality of software applications, (i) a corresponding third frequency associated with execution of the respective software application on the reference computing device and (ii) a corresponding fourth frequency associated with execution of the respective software application across the computing devices. The corresponding importance value may be determined for each respective software application of the first plurality of software applications, based on a product of (i) the corresponding first frequency and (ii) an inverse of the corresponding second frequency. The corresponding importance value may be determined, for each respective software application of the second plurality of software applications, based on a product of (i) the corresponding third frequency and (ii) an inverse of the corresponding fourth frequency.

In some embodiments, determining the device fingerprint and the reference device fingerprint may include performing (i) a first concatenation based on the first plurality of representations and (ii) a second concatenation based on the second plurality of representations.

In some embodiments, determining the device fingerprint and the reference device fingerprint may include determining the device fingerprint by processing the first plurality of representations by a machine learning model that has been trained to generate device fingerprints based on representations of software applications, and determining the reference device fingerprint by processing the second plurality of representations by the machine learning model.

In some embodiments, the device fingerprint may include a first character string generated based on attributes of software processes associated with the first plurality of representations, and the reference device fingerprint may include a second character string generated based on attributes of software processes associated with the second plurality of representations.

In some embodiments, the device fingerprint may include a first vector that includes a first plurality of values that represents attributes of software processes associated with the first plurality of representations, and the reference device fingerprint may include a second vector that includes a second plurality of values that represents attributes of software processes associated with the second plurality of representations.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid-state drives, or compact disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining a plurality of representations of a plurality of software applications installed on a computing device;
    determining corresponding importance values comprising, for each respective software application of the plurality of software applications, a corresponding importance value;
    generating a device fingerprint of the computing device by processing the plurality of representations of the plurality of software applications and the corresponding importance values by a machine learning model that has been trained to generate device fingerprints based on representations of software applications and importance values thereof, wherein the device fingerprint represents a transformation by the machine learning model of the plurality of representations of the plurality of software applications according to the corresponding importance values; and
    storing a representation of the device fingerprint.

2. The computer-implemented method of claim 1, wherein the transformation of the plurality of representations performed by the machine learning model is conditioned on the corresponding importance values.

3. The computer-implemented method of claim 1, wherein determining a particular importance value of the corresponding importance values for a particular software application of the plurality of software applications comprises:
    determining, for the particular software application, (i) a first frequency associated with execution of the particular software application on the computing device and (ii) a second frequency associated with execution of the particular software application across a plurality of other computing devices; and
    determining, for the particular software application, the particular importance value based on (i) the first frequency and (ii) an inverse of the second frequency.

4. The computer-implemented method of claim 1, wherein the corresponding importance values comprise one or more of: (i) a numerical value selected from a predetermined numerical scale or (ii) a categorical value selected from a plurality of predetermined categories.

5. The computer-implemented method of claim 1, wherein generating the device fingerprint comprises:
    determining that the corresponding importance values exceed a threshold importance value; and
    based on determining that the corresponding importance values exceed the threshold importance value, generating the device fingerprint by processing the plurality of representations and the corresponding importance values by the machine learning model.

6. The computer-implemented method of claim 1, wherein a particular representation of the plurality of representations comprises a representation of an attribute of a software processes associated with a corresponding software application of the plurality of software applications.

7. The computer-implemented method of claim 1, wherein the device fingerprint comprises one or more of: (i) a character string generated by the machine learning model or (ii) a vector generated by the machine learning model.

8. The computer-implemented method of claim 1, further comprising:
    generating a reference device fingerprint of a reference computing device by processing, by the machine learning model, a second plurality of representations of a second plurality of software applications installed on the reference computing device;

determining a disparity between the computing device and the reference computing device based on comparing the device fingerprint to the reference device fingerprint; and storing, in a persistent storage, a representation of the disparity.

9. The computer-implemented method of claim 8, wherein:

obtaining the plurality of representations comprises obtaining, for each respective computing device of a plurality of computing devices, a corresponding plurality of representations of a corresponding plurality of software applications installed on the respective computing device, generating the device fingerprint comprises generating, for each respective computing device of the plurality of computing devices, a corresponding device fingerprint by processing the corresponding plurality of representations by the machine learning model, comparing the device fingerprint to the reference device fingerprint comprises determining, based on the corresponding device fingerprint determined for each respective computing device, two or more clusters of the computing devices, a first cluster of the two or more clusters includes the computing device and the reference computing device, the method further comprises:
obtaining a selection of the first cluster, and
obtaining a selection of the reference computing device from the first cluster.

10. The computer-implemented method of claim 8, wherein:

obtaining the plurality of representations comprises obtaining, for each respective computing device of a plurality of computing devices, a corresponding plurality of representations of a corresponding plurality of software applications installed on the respective computing device, generating the device fingerprint comprises generating, for each respective computing device of the plurality of computing devices, a corresponding device fingerprint by processing the corresponding plurality of representations by the machine learning model, the method further comprises obtaining a selection of the reference computing device from the plurality of computing devices, and comparing the device fingerprint to the reference device fingerprint comprises, based on obtaining the selection of the reference computing device, determining, for each respective computing device of the plurality of computing devices, a similarity value indicative of a similarity between the respective computing device and the reference computing device.

11. The computer-implemented method of claim 10, wherein determining the disparity between the computing device and the reference computing device comprises determining, for each respective computing device having a similarity value that exceeds a threshold similarity value, a corresponding disparity between the respective computing device and the reference computing device.

12. The computer-implemented method of claim 10, wherein:

comparing the device fingerprint to the reference device fingerprint further comprises determining a ranking of the plurality of computing devices based on the similarity value determined for each respective computing device, and the method further comprises displaying representations of computing devices that have similarity values that exceed a threshold similarity value, wherein the representations are displayed arranged according to the ranking.

13. The computer-implemented method of claim 8, wherein determining the disparity between the computing device and the reference computing device comprises:

identifying a compliant software application that is installed on both the computing device and the reference computing device;

identifying a missing software application that is installed on the reference computing device but is not installed on the computing device; or identifying an unauthorized software application that is installed on the computing device but is not installed on the reference computing device.

14. The computer-implemented method of claim 8, further comprising:

retrieving, from the persistent storage, the representation of the disparity;

displaying, by way of a user interface, a visual representation of the disparity and a suggested modification to the plurality of software applications; and based on displaying the visual representation of the disparity and the suggested modification, receiving, by way of the user interface, instructions to execute the suggested modification.

15. The computer-implemented method of claim 8, wherein determining the disparity between the computing device and the reference computing device comprises:

determining a disparity between the plurality of software applications installed on the computing device and the second plurality of software applications installed on the reference computing device.

16. The computer-implemented method of claim 15, wherein determining the disparity between the plurality of software applications installed on the computing device and the second plurality of software applications installed on the reference computing device comprises:

comparing attributes of software processes associated with the plurality of software applications to corresponding attributes of software processes associated with the second plurality of software applications; and determining the disparity between the plurality of software applications installed on the computing device and the second plurality of software applications installed on the reference computing device based on comparing the attributes of the software processes associated with the plurality of software applications to corresponding attributes of the software processes associated with the second plurality of software applications.

17. An article of manufacture including a non-transitory computer-readable medium, having stored thereon program instructions that, upon execution by a computing system, cause the computing system to perform operations comprising:

obtaining a plurality of representations of a plurality of software applications installed on a computing device;

determining corresponding importance values comprising, for each respective software application of the plurality of software applications, a corresponding importance value;

generating a device fingerprint of the computing device by processing the plurality of representations of the plurality of software applications and the corresponding importance values by a machine learning model that has been trained to generate device fingerprints based on representations of software applications and importance values thereof, wherein the device fingerprint represents a transformation by the machine learning model of the plurality of representations of the plurality of software applications according to the corresponding importance values; and storing a representation of the device fingerprint.

18. The article of manufacture of claim 17, wherein determining a particular importance value of the corresponding importance values for a particular software application of the plurality of software applications comprises:

determining, for the particular software application, (i) a first frequency associated with execution of the particular software application on the computing device and (ii) a second frequency associated with execution of the particular software application across a plurality of other computing devices; and determining, for the particular software application, the particular importance value based on (i) the first frequency and (ii) an inverse of the second frequency.

19. A computing system comprising:

a processor; and non-transitory computer-readable medium having stored thereon program instructions that, upon execution by the processor, cause the processor to perform operations comprising:

obtaining a plurality of representations of a plurality of software applications installed on a computing device;

determining corresponding importance values comprising, for each respective software application of the plurality of software applications, a corresponding importance value;

generating a device fingerprint of the computing device by processing the plurality of representations of the plurality of software applications and the corresponding importance values by a machine learning model that has been trained to generate device fingerprints based on representations of software applications and importance values thereof, wherein the device fingerprint represents a transformation by the machine learning model of the plurality of representations of the plurality of software applications according to the corresponding importance values; and storing a representation of the device fingerprint.

20. The computing system of claim 19, wherein determining a particular importance value of the corresponding importance values for a particular software application of the plurality of software applications comprises:

determining, for the particular software application, (i) a first frequency associated with execution of the particular software application on the computing device and (ii) a second frequency associated with execution of the particular software application across a plurality of other computing devices; and determining, for the particular software application, the particular importance value based on (i) the first frequency and (ii) an inverse of the second frequency.

* * * * *